United States Patent
Negus et al.

(10) Patent No.: US 9,313,674 B2
(45) Date of Patent: *Apr. 12, 2016

(54) BACKHAUL RADIO WITH EXTREME INTERFERENCE PROTECTION

(71) Applicant: CBF Networks, Inc., San Jose, CA (US)

(72) Inventors: Kevin J. Negus, Jackson, WY (US); Sagnik Ghosh, San Jose, CA (US); Badri Varadarajan, Mountain View, CA (US)

(73) Assignee: CBF Networks, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/688,550

(22) Filed: Apr. 16, 2015

(65) Prior Publication Data

US 2015/0223082 A1   Aug. 6, 2015

Related U.S. Application Data

(63) Continuation of application No. 14/498,959, filed on Sep. 26, 2014, now Pat. No. 9,049,611, which is a continuation-in-part of application No. 14/337,744, filed on Jul. 22, 2014, now Pat. No. 9,055,463, which (Continued)

(51) Int. Cl.
*H04W 84/12* (2009.01)
*H04W 24/02* (2009.01)
(Continued)

(52) U.S. Cl.
CPC .............. *H04W 24/02* (2013.01); *H01Q 1/246* (2013.01); *H01Q 1/50* (2013.01); *H01Q 9/0407* (2013.01); *H01Q 9/0414* (2013.01); *H01Q 9/285* (2013.01); *H01Q 21/0018* (2013.01); *H01Q 21/0075* (2013.01); *H01Q 21/065* (2013.01); *H01Q 21/08* (2013.01); *H01Q 21/24* (2013.01);

(Continued)

(58) Field of Classification Search
None
See application file for complete search history.

(56) References Cited

U.S. PATENT DOCUMENTS

| D307,274 S | 4/1990 | Sasaki et al. |
|---|---|---|
| D335,128 S | 4/1993 | Soren |

(Continued)

FOREIGN PATENT DOCUMENTS

| EP | 2745539 | 6/2014 |
|---|---|---|
| EP | 2767102 | 8/2014 |

(Continued)

OTHER PUBLICATIONS

"AccessGate—RAN Optimization for Mobile Backhaul Systems," Product Data Sheet, Memotec, 2009, Montreal, Quebec, Canada, 2 pages.

(Continued)

*Primary Examiner* — Hassan Phillips
*Assistant Examiner* — Gautam Sharma
(74) *Attorney, Agent, or Firm* — Nixon Peabody LLP

(57) ABSTRACT

A backhaul radio is disclosed that operates in multipath propagation environments such as obstructed LOS conditions with uncoordinated interference sources in the same operating band. Such a backhaul radio may use a combination of interference mitigation procedures across multiple of the frequency, time, spatial and cancellation domains. Such backhaul radios may communicate with each other to coordinate radio resource allocations such that accurate interference assessment and channel propagation characteristics assessment may be determined during normal operation.

30 Claims, 20 Drawing Sheets

Related U.S. Application Data is a continuation of application No. 13/645,472, filed on Oct. 4, 2012, now Pat. No. 8,811,365, which is a continuation of application No. 13/371,366, filed on Feb. 10, 2012, now Pat. No. 8,311,023, which is a continuation of application No. 13/212,036, filed on Aug. 17, 2011, now Pat. No. 8,238,318.

(60) Provisional application No. 61/910,194, filed on Nov. 29, 2013.

(51) Int. Cl.

| | |
|---|---|
| *H01Q 21/00* | (2006.01) |
| *H01Q 9/28* | (2006.01) |
| *H01Q 21/26* | (2006.01) |
| *H01Q 1/24* | (2006.01) |
| *H01Q 21/24* | (2006.01) |
| *H01Q 21/29* | (2006.01) |
| *H01Q 25/00* | (2006.01) |
| *H01Q 9/04* | (2006.01) |
| *H01Q 21/06* | (2006.01) |
| *H01Q 21/08* | (2006.01) |
| *H01Q 1/50* | (2006.01) |
| *H04W 72/08* | (2009.01) |
| *H04W 76/04* | (2009.01) |
| *H04L 27/26* | (2006.01) |
| *H04L 25/03* | (2006.01) |

(52) U.S. Cl.
CPC .............. *H01Q 21/26* (2013.01); *H01Q 21/29* (2013.01); *H01Q 25/00* (2013.01); *H01Q 25/005* (2013.01); *H04W 72/082* (2013.01); *H04W 76/046* (2013.01); *H04L 27/265* (2013.01); *H04L 2025/03414* (2013.01)

(56) References Cited

U.S. PATENT DOCUMENTS

| | | |
|---|---|---|
| D349,897 S | 8/1994 | Soren et al. |
| D373,771 S | 9/1996 | Messelhi |
| 5,579,367 A | 11/1996 | Raymond et al. |
| D376,367 S | 12/1996 | Mailandt |
| D376,600 S | 12/1996 | Vallilee et al. |
| 5,604,744 A | 2/1997 | Andersson et al. |
| 5,809,422 A | 9/1998 | Raleigh et al. |
| D401,592 S | 11/1998 | Nishimura et al. |
| 5,890,055 A | 3/1999 | Chu et al. |
| RE36,591 E | 2/2000 | Hayashi et al. |
| 6,253,060 B1 | 6/2001 | Komara et al. |
| 6,310,584 B1 | 10/2001 | Reece et al. |
| D455,420 S | 4/2002 | Arpe |
| 6,377,217 B1 | 4/2002 | Zhu et al. |
| 6,462,710 B1 | 10/2002 | Carson et al. |
| 6,463,303 B1 | 10/2002 | Zhao |
| 6,486,828 B1 | 11/2002 | Cahn et al. |
| 6,529,172 B2 | 3/2003 | Zimmerman |
| 6,912,195 B2 | 6/2005 | Vook et al. |
| D507,263 S | 7/2005 | Narita |
| 6,985,123 B2 | 1/2006 | Gottl |
| 6,995,712 B2 | 2/2006 | Boyanov |
| 7,027,837 B1 | 4/2006 | Uhlik et al. |
| 7,171,223 B2 | 1/2007 | Herscovich et al. |
| 7,221,722 B2 | 5/2007 | Thomas et al. |
| 7,260,141 B2 | 8/2007 | Bierly et al. |
| 7,280,082 B2 | 10/2007 | Theobold et al. |
| 7,292,663 B1 | 11/2007 | Van Wechel et al. |
| D565,534 S | 4/2008 | Ingalsbe et al. |
| 7,394,439 B1 | 7/2008 | Johnson et al. |
| 7,403,501 B2 | 7/2008 | Bordonaro et al. |
| D595,274 S | 6/2009 | Skottke et al. |
| D596,627 S | 7/2009 | Cho et al. |
| 7,587,177 B1 | 9/2009 | Kwong |
| 7,593,729 B2 | 9/2009 | Barak et al. |
| 7,599,290 B2 | 10/2009 | Dos Remedios et al. |
| D604,724 S | 11/2009 | Vorreiter et al. |
| 7,616,554 B2 | 11/2009 | Asai et al. |
| 7,620,370 B2 | 11/2009 | Barak et al. |
| D619,571 S | 7/2010 | Lee |
| 7,756,519 B2 | 7/2010 | Barak et al. |
| D622,256 S | 8/2010 | Lockenwitz |
| 7,848,241 B2 | 12/2010 | Natarajan et al. |
| 7,948,942 B2 | 5/2011 | Zhang et al. |
| 7,978,144 B2 | 7/2011 | Tanabe et al. |
| D643,025 S | 8/2011 | Podduturi |
| 8,078,109 B1 | 12/2011 | Mulcay |
| 8,175,535 B2 | 5/2012 | Mu |
| 8,238,318 B1 | 8/2012 | Negus |
| 8,249,527 B2 | 8/2012 | Rybicki |
| 8,300,590 B1 | 10/2012 | Negus et al. |
| 8,311,023 B1 | 11/2012 | Negus |
| 8,385,305 B1 | 2/2013 | Negus et al. |
| 8,422,540 B1 | 4/2013 | Negus et al. |
| 8,462,709 B2 | 6/2013 | Nanda et al. |
| 8,467,363 B2 | 6/2013 | Lea et al. |
| 8,487,813 B2 | 7/2013 | Leiba et al. |
| 8,502,733 B1 | 8/2013 | Negus et al. |
| 8,638,839 B2 | 1/2014 | Negus et al. |
| D704,174 S | 5/2014 | Negus et al. |
| 8,718,566 B2 | 5/2014 | Prather |
| 8,737,308 B2 | 5/2014 | Gaal et al. |
| 8,761,100 B2 | 6/2014 | Negus et al. |
| 8,811,365 B2 | 8/2014 | Negus |
| 8,824,442 B2 | 9/2014 | Lea et al. |
| 8,830,943 B2 | 9/2014 | Negus et al. |
| 8,872,715 B2 | 10/2014 | Lea et al. |
| 8,928,542 B2 | 1/2015 | Lea et al. |
| 8,942,216 B2 | 1/2015 | Negus et al. |
| 8,948,235 B2 | 2/2015 | Negus et al. |
| 9,001,809 B2 | 4/2015 | Lea et al. |
| 9,049,611 B2 | 6/2015 | Negus et al. |
| 9,055,463 B2 | 6/2015 | Negus et al. |
| 2001/0030939 A1 | 10/2001 | Vijayan et al. |
| 2001/0035844 A1 | 11/2001 | Reece et al. |
| 2001/0050927 A1 | 12/2001 | Johnson |
| 2002/0060993 A1 | 5/2002 | Dent |
| 2002/0064141 A1 | 5/2002 | Sakakura |
| 2004/0006573 A1 | 1/2004 | Takashi |
| 2004/0137924 A1 | 7/2004 | Herscovich et al. |
| 2004/0151238 A1 | 8/2004 | Masenten |
| 2004/0165650 A1 | 8/2004 | Miyazaki et al. |
| 2005/0026616 A1 | 2/2005 | Cavalli et al. |
| 2005/0068231 A1 | 3/2005 | Regnier et al. |
| 2005/0075078 A1 | 4/2005 | Makinen et al. |
| 2005/0219140 A1 | 10/2005 | Browne et al. |
| 2006/0056365 A1 | 3/2006 | Das et al. |
| 2006/0079290 A1 | 4/2006 | Seto et al. |
| 2006/0141929 A1 | 6/2006 | Lockie et al. |
| 2006/0164271 A1 | 7/2006 | Hirt et al. |
| 2006/0209746 A1 | 9/2006 | Asai et al. |
| 2006/0253526 A1 | 11/2006 | Welch et al. |
| 2006/0273952 A1 | 12/2006 | Krikorian et al. |
| 2007/0097899 A1 | 5/2007 | Larsson et al. |
| 2007/0146225 A1 | 6/2007 | Boss et al. |
| 2007/0155431 A1 | 7/2007 | Munzner et al. |
| 2007/0243878 A1 | 10/2007 | Taira et al. |
| 2007/0264935 A1 | 11/2007 | Mohebbi |
| 2008/0014948 A1 | 1/2008 | Scheinert |
| 2008/0043882 A1 | 2/2008 | Zhang et al. |
| 2008/0080364 A1 | 4/2008 | Barak et al. |
| 2008/0090575 A1 | 4/2008 | Barak et al. |
| 2008/0159212 A1 | 7/2008 | Zhang et al. |
| 2008/0181282 A1 | 7/2008 | Wala et al. |
| 2008/0240307 A1 | 10/2008 | Wang et al. |
| 2008/0242232 A1 | 10/2008 | Zavadsky et al. |
| 2008/0274745 A1 | 11/2008 | Barak et al. |
| 2009/0010238 A1 | 1/2009 | Barak et al. |
| 2009/0052411 A1 | 2/2009 | Leung et al. |
| 2009/0067526 A1 | 3/2009 | Ratermann et al. |
| 2009/0111463 A1 | 4/2009 | Simms et al. |
| 2009/0121963 A1 | 5/2009 | Greene |
| 2009/0143017 A1 | 6/2009 | Barak et al. |

(56) References Cited

U.S. PATENT DOCUMENTS

| | | | |
|---|---|---|---|
| 2009/0252134 | A1 | 10/2009 | Schlicht et al. |
| 2009/0274130 | A1 | 11/2009 | Boch |
| 2009/0304055 | A1 | 12/2009 | Nino et al. |
| 2009/0312022 | A1 | 12/2009 | Viorel et al. |
| 2009/0323621 | A1 | 12/2009 | Touboul et al. |
| 2010/0009694 | A1 | 1/2010 | Fischer |
| 2010/0033396 | A1 | 2/2010 | Tanabe et al. |
| 2010/0046439 | A1 | 2/2010 | Chen et al. |
| 2010/0056205 | A1 | 3/2010 | Fuss |
| 2010/0157970 | A1 | 6/2010 | Gotman et al. |
| 2010/0261423 | A1 | 10/2010 | Stanforth et al. |
| 2010/0272006 | A1 | 10/2010 | Bertrand et al. |
| 2010/0309048 | A1 | 12/2010 | Polisetty et al. |
| 2011/0044279 | A1 | 2/2011 | Johansson et al. |
| 2011/0070855 | A1 | 3/2011 | Mariotti |
| 2011/0085525 | A1 | 4/2011 | Patini |
| 2011/0103292 | A1 | 5/2011 | Pasad et al. |
| 2011/0164186 | A1 | 7/2011 | Sadek |
| 2011/0182174 | A1 | 7/2011 | Pi et al. |
| 2011/0206155 | A1 | 8/2011 | Fujimura et al. |
| 2011/0235514 | A1 | 9/2011 | Huang et al. |
| 2011/0250852 | A1 | 10/2011 | Greene |
| 2012/0058777 | A1 | 3/2012 | Nguyen et al. |
| 2012/0063472 | A1 | 3/2012 | Le Pallec et al. |
| 2012/0108284 | A1 | 5/2012 | Patel et al. |
| 2012/0122477 | A1 | 5/2012 | Sadek et al. |
| 2012/0135724 | A1 | 5/2012 | Lewis et al. |
| 2012/0184222 | A1 | 7/2012 | Seok |
| 2012/0213086 | A1 | 8/2012 | Matsuura et al. |
| 2013/0089041 | A1 | 4/2013 | Negus et al. |
| 2013/0089042 | A1 | 4/2013 | Negus et al. |
| 2013/0089083 | A1 | 4/2013 | Negus et al. |
| 2013/0095765 | A1 | 4/2013 | Greene |
| 2013/0100897 | A1 | 4/2013 | Negus |
| 2013/0272217 | A1 | 10/2013 | Negus et al. |
| 2013/0273974 | A1 | 10/2013 | Lea et al. |
| 2013/0288593 | A1 | 10/2013 | Norin et al. |
| 2013/0293419 | A1 | 11/2013 | Negus et al. |
| 2014/0050162 | A1 | 2/2014 | McCoy |
| 2014/0184455 | A1 | 7/2014 | Lea et al. |
| 2014/0329562 | A1 | 11/2014 | Proctor, Jr. et al. |
| 2015/0016362 | A1 | 1/2015 | Negus et al. |
| 2015/0016561 | A1 | 1/2015 | Negus et al. |
| 2015/0049720 | A1 | 2/2015 | Negus et al. |
| 2015/0084826 | A1 | 3/2015 | Lea et al. |
| 2015/0156777 | A1 | 6/2015 | Negus et al. |
| 2015/0194999 | A1 | 7/2015 | Lea et al. |
| 2015/0372738 | A1 | 12/2015 | Negus et al. |
| 2016/0013831 | A1 | 1/2016 | Lea et al. |

FOREIGN PATENT DOCUMENTS

| | | |
|---|---|---|
| EP | 2839693 | 2/2015 |
| EP | 2843863 A1 | 3/2015 |
| WO | 2011030960 | 3/2011 |
| WO | 2011080299 | 7/2011 |
| WO | WO 2013025413 A1 | 2/2013 |
| WO | WO 2013055947 A1 | 4/2013 |
| WO | WO 2013158237 A2 | 10/2013 |
| WO | WO 2014040083 A2 | 3/2014 |

OTHER PUBLICATIONS

"Advances in Backhaul Synchronization—Maximizing ROI," Application Brief, Symmetricom Inc., 2008, 6 pages.

"Carrier Ethernet Services Overview," Presentation, MEF, Aug. 2008, 32 pages.

"Clock Distribution and Synchronization over Ethernet: IEEE1588v2 and SyncE," Presentation, VITESSE, Sep. 2009, 9 pages.

"Clock Synchronization in Carrier Ethernet Networks—Synchronous Ethernet and 1588v2 on Juniper Networks MX Series 3D Universal Edge Routers," White Paper, Juniper Networks, Inc., 2010, 11 pages.

"DAN2400-PTP—Open SoC Platform for Sub-6GHz Wireless Point-to-Point Systems," DesignArt Networks, Jul. 2008, 2 pages.

"Doubling Capacity in Wireless Channels," Provigent Inc., 2008, 3 pages.

"Evolving Microwave Mobile Backhaul for Next-Generation Networks," White Paper, NEC Corp., Feb. 2008, 4 pages.

"GainSpan GS1011M Low Power Wi-Fi® Module Family," Product Brief—Preliminary, GainSpan Corp., 2009, 2 pages.

"HMC536MS8G / 536MS8GE—GaAs MMIC Positive Control T/R Switch, DC—6 GHz," Data Sheet, Switches—SMT, Hittite Microwave Corp., 2008, pp. 10.295-10.299.

"IEEE 1588v2 (Precision Time Protocol) Testing," Application Note, IXIA, Dec. 2009.

"Information Technology—Open Systems Interconnection—Basic Reference Model: The Basic Model," International Standard, ISO/IEC 7498-1, Second Edition Nov. 15, 1994, Corrected and Reprinted Jun. 15, 1996, 68 pages.

"MGA-21108—Broadband Fully Integrated Matched Low-Noise Amplifier MMIC," Data Sheet, Avago Technologies, Aug. 2009, 21 pages.

"MGA-22003—2.3-2.7 GHz 3x3mm WiMAX/WiBro and WiFi Linear Amplifier Module," Data Sheet, Avago Technologies, Mar. 2010, 15 pages.

"MGA-23003—3.3-3.8 GHz 3x3mm WiMAX Power Amplifier," Data Sheet, Avago Technologies, Mar. 2010, 16 pages.

"MGA-25203—5.1-5.9GHz 3x3mm WiFi and WiMAX Power Amplifier," Data Sheet, Avago Technologies, Mar. 2010, 14 pages.

"MGA-43328—High Linearity Wireless Data Power Amplifier for 2.5 to 2.7 GHz Applications," Application Note, Avago Technologies, Apr. 2010, 10 pages.

"MGA-43328—(2.5-2.7) GHz 29dBm High Linearity Wireless Data Power Amplifier," Data Sheet, Avago Technologies, Mar. 2010, 19 pages.

"MGA-645T6—Low Noise Amplifier with Bypass/Shutdown Mode in Low Profile Package," Data Sheet, Avago Technologies, Nov. 2009, 16 pages.

"MGA-655T6—Low Noise Amplifier with Bypass Mode in Low Profile Package," Data Sheet, Avago Technologies, Nov. 2009, 14 pages.

"MGA-675T6—Low Noise Amplifier with Shutdown Mode in Low Profile Package for 4.9—6 GHz Application," Data Sheet, Avago Technologies, Nov. 2009, 16 pages.

"Part 11: Wireless LAN Medium Access Control (MAC) and Physical Layer (PHY) Specifications—Amendment 5: Enhancements for Higher Throughput," IEEE Standard for Information Technology—Telecommunications and Information Exchange Between Systems—Local and Metropolitan Area Networks—Specific Requirements, IEEE Computer Society, IEEE Std 802.11, Sep. 2009, 536 pages.

"Part 11: Wireless LAN Medium Access Control (MAC) and Physical Layer (PHY) Specifications," IEEE Standard for Information Technology—Telecommunications and Information Exchange Between Systems—Local and Metropolitan Area Networks—Specific requirements, IEEE Computer Society, IEEE Std 802.11, Jun. 2007, 1233 pages.

"Part 16: Air Interface for Fixed and Mobile Broadband Wireless Access Systems—Amendment 2: Physical and Medium Access Control Layers for Combined Fixed and Mobile Operation in Licensed Bands and Corrigendum 1," IEEE Standard for Local and Metropolitan Area Networks, IEEE Computer Society and the IEEE Microwave Theory and Techniques Society, IEEE Std 802.16e—2005 and IEEE Std 802.16/2004/Cor1-2005, Feb. 2006, 864 pages.

"Part 16: Air Interface for Fixed Broadband Wireless Access Systems," IEEE Standard for Local and Metropolitan Area Networks, IEEE Std 802.16, IEEE Computer Society and the IEEE Microwave Theory and Techniques Society, Oct. 2004, 895 pages.

"PC203—PC203-10—Basestation PHY Processor," Wireless Communications Processors, Product Brief, picoChip Flexible Wireless, 2008, 4 pages.

"SC-FDMA—Single Carrier FDMA in LTE," Data Sheet, IXIA Corp., Nov. 2009, 16 pages.

(56) References Cited

OTHER PUBLICATIONS

"Spectrum Sharing: The Promise and the Reality", RYSAVY Research, LLC, White Paper, Jul. 2012, pp. 1-12, available at http://www.rysavy.com.
"Technical Report: Electromagenetic Compatibility and Radio Spectrum Matters (ERM); System Reference Document (SRdoc); Mobile Broadband Services in the 2 300 MHz—2 400 MHz frequency band under Licensed Shared Access Regime", ETSI TR 103 113 V1.1.1 (Jul. 2013), European Telecommunications Standards Institute, France, 2013, pp. 1-37.
"Understanding MPLS-TP and Its Benefits," White Paper, Cisco Systems Inc., 2009, 6 pages.
"WiMAX/WiBro RF MxFE Transceiver, AD9352," Data Sheet, Analog Devices, 2007.
"WiMAX RF MxFE Transceiver, AD9352-5," Data Sheet, Analog Devices, 2008.
"WiMAX RF MxFE Transceiver, AD9353," Data Sheet, Analog Devices, 2007.
"WiMAX/WiBro RF MxFE MISO Transceiver, AD9354," Data Sheet, Analog Devices, 2008-2009.
"WiMAX/WiBro RF MxFE MISO Transceiver, AD9355," Data Sheet, Analog Devices, 2008-2009.
"WiMAX/BWA/WiBRO/LTE RF MxFE 2×2 MIMO Transceiver, AD9356," Data Sheet, Analog Devices, 2010.
"WiMAX/BWA/LTE RF MxFE 2×2 MIMO Transceiver, AD9357," Data Sheet, Analog Devices, 2010.
Baum, D.S. et al., "An Interim Channel Model for Beyond-3G Systems—Extending the 3GPP Spatial Channel Model (SCM)," IEEE, Vehicular Technology Conference, vol. 5, 2005, pp. 3132-3136.
Beller, D. et al., "MPLS-TP—The New Technology for Packet Transport Networks," Alcatel-Lucent Deutschland AG, Stuttgart, 2009, 11 pages.
Chundury, R., "Mobile Broadband Backhaul: Addressing the Challenge," Planning Backhaul Networks, Ericsson Review, 2008, pp. 4-9.
Conrat, J-M. et al., "Typical MIMO Propagation Channels in Urban Macrocells at 2 GHz," EURASIP Journal on Wireless Communications and Networking, vol. 2007, Iss. 2, Jan. 2007, 9 pages.
Coon, J.P. et al., "Adaptive Frequency-Domain Equalization for Single-Carrier Multiple-Input Multiple-Output Wireless Transmissions," IEEE Transactions on Signal Processing, vol. 53, No. 8, Aug. 2005, pp. 3247-3256.
Coon, J.P. et al., "An Investigation of MIMO Single-Carrier Frequency-Domain MMSE Equalization," Centre for Communications Research, University of Bristol, Sep. 2002, 4 pages.
Durgin, G.D., "Wideband Measurements of Angle and Delay Dispersion for Outdoor and Indoor Peer-to-Peer Radio Channels at 1920 MHz," IEEE Transactions on Antennas and Propagation, vol. 51, No. 5, May 2003, pp. 936-944.
Falconer, D.D. et al., "Broadband Wireless Using Single Carrier and Frequency Domain Equalization," Invited Overview Paper for WPMC '02, Honolulu, Oct. 2002, 10 pages.
Falconer, D.D. et al., "Frequency Domain Equalization for Single-Carrier Broadband Wireless Systems," Wideband Wireless Access Technologies to Broadband Internet, IEEE Communications Magazine, Apr. 2002, pp. 58-66.
Frost, D. et al., "MPLS Transport Profile Data Plane Architecture," Internet Engineering Task Force, RFC 5960, Aug. 2010, 16 pages.
Gao, S.C. et al., "Dual-polarized slot coupled planar antenna with wide bandwidth," IEEE Trans. Antennas and Propagation, vol. 51, No. 3, pp. 441-448, 2003.
Garner, G.M., "IEEE 1588 Version 2," ISPCS Ann Arbor '08, Sep. 2008, 89 pages.
Hentschel, T. et al., "The Digital Front-End—Bridge Between RF and Baseband-Processing," Software Defined Radio: Enabling Technologies by Walter Tuttlebee, Chapter 6, Jun. 2002, 58 pages.
Lashkarian, N., "Reconfigurable Digital Front-end Architecture for Wireless Base-Station Transmitters: Analysis, Design and FPGA Implementation," Seminar Presentation, University of California, Berkeley, Apr. 2006, 86 pages.
Nathanzon, G. et al., "Cost-Effective Backhaul Alternatives for WiMAX Networks: Challenges & Solutions," Provigent Inc., Jun. 2008, 16 pages.
Padhi, S.K. et al., "A Dual Polarized Aperture Coupled Circular Patch Antenna Using a C-Shaped Coupling Slot," IEEE Transactions on Antennas and Propagation, vol. 51, No. 12, Dec. 2003, pp. 3295-3298.
Pancaldi, F. et al., "Single-Carrier Frequency Domain Equalization—A Focus on Wireless Applications," IEEE Signal Processing Magazine, Sep. 2008, 22 pages.
Pozar, D.M. et al., "Improved coupling for aperature-coupled microstrip antennas," Electron. Lett., vol. 27, No. 13, pp. 1129-1131, 1991.
Pozar, D.M., "A microstrip antenna aperature-coupled to a microstripline," Electron. Lett., vol. 21, No. 2, pp. 49-50, 1985.
Sharony, J., "Introduction to Wireless MIMO—Theory and Applications," CEWIT—Center of Excellence in Wireless and Informational Technology, Stony Brook University, IEEE LI, Nov. 15, 2006, 63 pages.
Soffer, R., "Microwave Wireless Backhaul for LTE Networks—Meeting the Rapidly-Increasing Demand for Mobile Data," Provigent Inc., Jan. 2010, 18 pages.
Soffer, R., "ProviBand—Next Generation Wireless Backhaul Technology," Technical White Paper, Provigent Inc., Jan. 2006, 13 pages.
Stuber, G.L. et al., "Broadband MIMO-OFDM Wireless Communications," Invited Paper, Proceedings of the IEEE, vol. 92, No. 2, Feb. 2004, pp. 271-294.
Tubbax, J., "OFDM Versus Single Carrier with Cyclic Prefix: A System-based Comparison for Binary Modulation," IMEC, Belgium, Jan. 2011, 4 pages.
Part 1 of 2: "TV Whitespaces" reuse: A detailed description of the program is provided in FCC order FCC-10-174A1, and the rules for unlicensed devices that operate in the TV bands are set forth in 47 C.P.R. §§ 15.701-.717. See Title 47—Telecommunication; Chapter I—Federal Communications Commission; Subchapter A—General, Part 15-Radio Frequency Devices, Subpart H—Television Band Devices.
Part 2 of 2 (continued from above): (Available online at http://www.ecfr.gov/cgi-bin/text-idx?c=ecfr
&SID=30f46f0753577b10de41d650c7adf941&rgn=div6
&view=text&node=47:1.0.1.1.16.8&idno=47:1.0.1.1.16.8
&idno=47, retrieved Feb. 25, 2015).
Notice of Allowance in U.S. Appl. No. 13/212,036, dated Apr. 3, 2012.
Office Action in U.S. Appl. No. 13/271,051, dated Jun. 14, 2013.
Amendment and Response to Office Action in U.S. Appl. No. 13/271,051, filed Dec. 16, 2013.
Notice of Allowance in U.S. Appl. No. 13/271,051, dated Feb. 3, 2014.
Office Action in U.S. Appl. No. 13/371,346, dated Sep. 26, 2012.
Amendment and Response to Office Action in U.S. Appl. No. 13/371,346, filed Dec. 21, 2012.
Applicant Initiated Interview Summary in U.S. Appl. No. 13/371,346, filed Jan. 10, 2013.
Supplemental Amendment and Response to Office Action in U.S. Appl. No. 13/371,346, filed Jan. 25, 2013.
Notice of Allowance in U.S. Appl. No. 13/371,346, dated Apr. 2, 2013.
Office Action in U.S. Appl. No. 13/371,366, dated Apr. 19, 2012.
Amendment and Response to Office Action in U.S. Appl. No. 13/371,366, dated Jul. 19, 2012.
Notice of Allowance in U.S. Appl. No. 13/371,366, dated Sep. 21, 2012.
Office Action in U.S. Appl. No. 13/415,778, mailed Apr. 26, 2012.
Applicant Initiated Interview Summary in U.S. Appl. No. 13/415,778, filed Jul. 5, 2012.
Amendment and Response to Office Action in U.S. Appl. No. 13/415,778, dated Jul. 26, 2012.
Notice of Allowance in U.S. Appl. No. 13/415,778, mailed Sep. 17, 2012.
Office Action in U.S. Appl. No. 13/448,294, dated on Jun. 21, 2012.
Amendment and Response to Office Action in U.S. Appl. No. 13/448,294, dated Sep. 21, 2012.

(56) References Cited

OTHER PUBLICATIONS

Notice of Allowance in U.S. Appl. No. 13/448,294, dated Oct. 23, 2012.
Notice of Allowance in U.S. Appl. No. 13/536,927, dated Feb. 19, 2013.
Notice of Allowance in U.S. Appl. No. 29/429,634 dated Dec. 5, 2013.
Office Action in U.S. Appl. No. 13/632,961, dated May 6, 2014.
Office Action in U.S. Appl. No. 13/632,993, dated Jan. 30, 2015.
Notice of Allowance in U.S. Appl. No. 13/633,028, dated May 1, 2014.
Office Action in U.S. Appl. No. 13/645,472, dated May 24, 2013.
Amendment and Response to Office Action in U.S. Appl. No. 13/645,472, dated Nov. 25, 2013.
Supplemental Amendment and Response to Office Action in U.S. Appl. No. 13/645,472, dated Jan. 27, 2014.
Notice of Allowance in U.S. Appl. No. 13/645,472, dated Apr. 4, 2014.
Notice of Allowance in U.S. Appl. No. 13/748,544, dated Aug. 15, 2014.
Notice of Allowance in U.S. Appl. No. 13/898,429, dated Apr. 8, 2014.
Office Action in U.S. Appl. No. 13/934,175, dated Oct. 15, 2014.
Notice of Allowance in U.S. Appl. No. 13/934,175, dated May 28, 2015.
Notice of Allowance in U.S. Appl. No. 14/197,158, dated Sep. 3, 2014.
Examiner Initiated Interview Summary in U.S. Appl. No. 14/197,158, filed Sep. 3, 2014.
Office Action in U.S. Appl. No. 14/151,190 dated Mar. 28, 2014.
Applicant Initiated Interview Summary in U.S. Appl. No. 14/151,190, dated May 29, 2014.
Amendment and Response to Office Action in U.S. Appl. No. 14/151,190, dated Jun. 30, 2014.
Examiner Initiated Interview Summary in U.S. Appl. No. 14/151,190, dated Oct. 14, 2014.
Notice of Allowance in U.S. Appl. 14/151,190, dated Oct. 14, 2014.
Examiner Initiated Interview Summary in U.S. Appl. No. 14/199,734, dated Jun. 13, 2014.
Notice of Allowance in U.S. Appl. No. 14/199,734, dated Jun. 13, 2014.
Notice of Allowance in U.S. Appl. No. 14/336,958, dated Nov. 26, 2014.
Preliminary Amendment and Response in U.S. Appl. No. 14/337,744, dated Aug. 20, 2014.
Applicant Response and Amendment in U.S. Appl. No. 14/337,744, dated Oct. 6, 2014.
Notice of Allowance in U.S. Appl. No. 14/337,744, dated Jan. 12, 2015.
Office Action in U.S. Appl. No. 14/502,471, dated Jan. 5, 2015.
Notice of Allowance in U.S. Appl. No. 14/498,959, dated Jan. 12, 2015.
Office Action in U.S. Appl. No. 14/552,431, dated Mar. 12, 2015.
Notice of Allowance in U.S. Appl. No. 14/632,624, dated May 26, 2015.
International Search Report and Written Opinion for PCT Application No. PCT/US2012/049948 dated Oct. 22, 2012.
International Search Report and Written Opinion for PCT Application No. PCT/US2012/059797 dated Jan. 2, 2013.
International Search Report and Written Opinion for PCT Application No. PCT/US2013/029731 dated May 13, 2013.
International Search Report and Written Opinion in PCT Application No. PCT/US013/48782, dated Jul. 29, 2013.
Extended European Search Report in European Patent Application No. 14177662.5, dated Feb. 3, 2015.
U.S. Appl. No. 14/686,674, filed Apr. 14, 2015.
U.S. Appl. No. 14/624,365, filed Feb. 17, 2015.
Amendment and Response to Office Action in U.S. Appl. No. 13/632,993, dated Jul. 27, 2015.
Notice of Allowance in U.S. Appl. No. 13/632,993, dated Aug. 21, 2015.
Applicant Response and Amendment in U.S. Appl. No. 14/502,471, dated Jul. 2, 2015.
Office Action in U.S. Appl. No. 14/502,471, dated Jul. 22, 2015.
Office Action in U.S. Appl. No. 14/552,431, dated Jul. 14, 2015.
Applicant Response and Amendment in U.S. Appl. No. 14/552,431, dated Aug. 10, 2015.
Notice of Allowance in U.S. Appl. No. 14/552,431, dated Aug. 19, 2015.
Office Action in U.S. Appl. No. 14/686,674, dated Jul. 23, 2015.
Amendment and Response to Office Action in U.S. Appl. No. 14/686,674, dated Aug. 31, 2015.
Notice of Allowance in U.S. Appl. No. 14/686,674, dated Oct. 5, 2015.
Extended European Search Report in European Patent Application No. 12824072.8, dated Jul. 20, 2015.
Notice of Allowance in U.S. Appl. No. 14/837,797, dated Dec. 30, 2015.
Notice of Allowance in U.S. Appl. No. 14/839,018, dated Dec. 21, 2015.
Notice of Allowance in U.S. Appl. No. 14/950,354, dated Feb. 17, 2016.

BACKHAUL RADIO WITH EXTREME INTERFERENCE PROTECTION

CROSS-REFERENCE TO RELATED APPLICATIONS

The present application is a continuation of U.S. patent application Ser. No. 14/498,959, filed on Sep. 26, 2014, which is a continuation-in-part application of U.S. patent application Ser. No. 14/337,744, filed on Jul. 22, 2014, which is a continuation application of U.S. patent application Ser. No. 13/645,472, filed on Oct. 4, 2012 (U.S. Pat. No. 8,811,365), which is a continuation application of U.S. patent application Ser. No. 13/371,366, filed on Feb. 10, 2012 (U.S. Pat. No. 8,311,023), which is a continuation application of U.S. patent application Ser. No. 13/212,036, filed on Aug. 17, 2011 (U.S. Pat. No. 8,238,318), the disclosures of which are hereby incorporated herein by reference in their entirety.

U.S. patent application Ser. No. 14/498,959 also claims priority to U.S. Provisional Patent Application Ser. No. 61/910,194, filed on Nov. 29, 2013, entitled "Extreme Interference Protection," the entirety of which is hereby incorporated by reference.

The present application is also related to U.S. patent application Ser. No. 13/632,993, filed Oct. 1, 2012, and U.S. Pat. Nos. 9,001,809, 8,989,762, 8,982,772, 8,948,235, 8,928,542, 8,830,943, 8,824,442, 8,761,100, 8,638,839, 8,467,363, 8,422,540 and 8,300,590, the disclosures of which are hereby incorporated herein by reference in their entirety.

BACKGROUND

1. Field

The present disclosure relates generally to data networking and in particular to a backhaul radio for connecting remote edge access networks to core networks in RF bands subject to uncoordinated interference.

2. Related Art

Data networking traffic has grown at approximately 100% per year for over 20 years and continues to grow at this pace. Only transport over optical fiber has shown the ability to keep pace with this ever-increasing data networking demand for core data networks. While deployment of optical fiber to an edge of the core data network would be advantageous from a network performance perspective, it is often impractical to connect all high bandwidth data networking points with optical fiber at all times. Instead, connections to remote edge access networks from core networks are often achieved with wireless radio, wireless infrared, and/or copper wireline technologies.

Radio, especially in the form of cellular or wireless local area network (WLAN) technologies, is particularly advantageous for supporting mobility of data networking devices. However, cellular base stations or WLAN access points inevitably become very high data bandwidth demand points that require continuous connectivity to an optical fiber core network.

When data aggregation points, such as cellular base station sites, WLAN access points, or other local area network (LAN) gateways, cannot be directly connected to a core optical fiber network, then an alternative connection, using, for example, wireless radio or copper wireline technologies, must be used. Such connections are commonly referred to as "backhaul."

Many cellular base stations deployed to date have used copper wireline backhaul technologies such as T1, E1, DSL, etc. when optical fiber is not available at a given site. However, the recent generations of HSPA+ and LTE cellular base stations have backhaul requirements of 100 Mb/s or more, especially when multiple sectors and/or multiple mobile network operators per cell site are considered. WLAN access points commonly have similar data backhaul requirements. These backhaul requirements cannot be practically satisfied at ranges of 300 m or more by existing copper wireline technologies. Even if LAN technologies such as Ethernet over multiple dedicated twisted pair wiring or hybrid fiber/coax technologies such as cable modems are considered, it is impractical to backhaul at such data rates at these ranges (or at least without adding intermediate repeater equipment). Moreover, to the extent that such special wiring (i.e., CAT 5/6 or coax) is not presently available at a remote edge access network location; a new high capacity optical fiber is advantageously installed instead of a new copper connection.

Rather than incur the large initial expense and time delay associated with bringing optical fiber to every new location, it has been common to backhaul cell sites, WLAN hotspots, or LAN gateways from offices, campuses, etc. using microwave radios. An exemplary backhaul connection using the microwave radios 132 is shown in FIG. 1. Traditionally, such microwave radios 132 for backhaul have been mounted on high towers 112 (or high rooftops of multi-story buildings) as shown in FIG. 1, such that each microwave radio 132 has an unobstructed line of sight (LOS) 136 to the other. These microwave radios 132 can have data rates of 100 Mb/s or higher at unobstructed LOS ranges of 300 m or longer with latencies of 5 ms or less (to minimize overall network latency).

Traditional microwave backhaul radios 132 operate in a Point to Point (PTP) configuration using a single "high gain" (typically >30 dBi or even >40 dBi) antenna at each end of the link 136, such as, for example, antennas constructed using a parabolic dish. Such high gain antennas mitigate the effects of unwanted multipath self-interference or unwanted co-channel interference from other radio systems such that high data rates, long range and low latency can be achieved. These high gain antennas however have narrow radiation patterns.

Furthermore, high gain antennas in traditional microwave backhaul radios 132 require very precise, and usually manual, physical alignment of their narrow radiation patterns in order to achieve such high performance results. Such alignment is almost impossible to maintain over extended periods of time unless the two radios have a clear unobstructed line of sight (LOS) between them over the entire range of separation. Furthermore, such precise alignment makes it impractical for any one such microwave backhaul radio to communicate effectively with multiple other radios simultaneously (i.e., a "point to multipoint" (PMP) configuration).

In wireless edge access applications, such as cellular or WLAN, advanced protocols, modulation, encoding and spatial processing across multiple radio antennas have enabled increased data rates and ranges for numerous simultaneous users compared to analogous systems deployed 5 or 10 years ago for obstructed LOS propagation environments where multipath and co-channel interference were present. In such systems, "low gain" (usually <6 dBi) antennas are generally used at one or both ends of the radio link both to advantageously exploit multipath signals in the obstructed LOS environment and allow operation in different physical orientations as would be encountered with mobile devices. Although impressive performance results have been achieved for edge access, such results are generally inadequate for emerging backhaul requirements of data rates of 100 Mb/s or higher, ranges of 300 m or longer in obstructed LOS conditions, and latencies of 5 ms or less.

In particular, "street level" deployment of cellular base stations, WLAN access points or LAN gateways (e.g., deployment at street lamps, traffic lights, sides or rooftops of single or low-multiple story buildings) suffers from problems because there are significant obstructions for LOS in urban environments (e.g., tall buildings, or any environments where tall trees or uneven topography are present).

FIG. 1 illustrates edge access using conventional unobstructed LOS PTP microwave radios 132. The scenario depicted in FIG. 1 is common for many $2^{nd}$ Generation (2G) and $3^{rd}$ Generation (3G) cellular network deployments using "macrocells". In FIG. 1, a Cellular Base Transceiver Station (BTS) 104 is shown housed within a small building 108 adjacent to a large tower 112. The cellular antennas 116 that communicate with various cellular subscriber devices 120 are mounted on the towers 112. The PTP microwave radios 132 are mounted on the towers 112 and are connected to the BTSs 104 via an nT1 interface. As shown in FIG. 1 by line 136, the radios 132 require unobstructed LOS.

The BTS on the right 104a has either an nT1 copper interface or an optical fiber interface 124 to connect the BTS 104a to the Base Station Controller (BSC) 128. The BSC 128 either is part of or communicates with the core network of the cellular network operator. The BTS on the left 104b is identical to the BTS on the right 104a in FIG. 1 except that the BTS on the left 104b has no local wireline nT1 (or optical fiber equivalent) so the nT1 interface is instead connected to a conventional PTP microwave radio 132 with unobstructed LOS to the tower on the right 112a. The nT1 interfaces for both BTSs 104a, 104b can then be backhauled to the BSC 128 as shown in FIG. 1.

In the conventional PTP radios 132, as described in greater detail in U.S. patent application Ser. No. 14/337,744 and incorporated herein, the antenna is typically of very high gain such as can be achieved by a parabolic dish so that gains of typically >30 dBi (or even sometimes >40 dBi), can be realized. Such an antenna usually has a narrow radiation pattern in both the elevation and azimuth directions. The use of such a highly directive antenna in a conventional PTP radio link with unobstructed LOS propagation conditions ensures that a modem within such radios has insignificant impairments at the receiver due to multipath self-interference and further substantially reduces the likelihood of unwanted co-channel interference due to other nearby radio links. However, the conventional PTP radio on a whole is completely unsuitable for obstructed LOS or PMP operation.

In U.S. patent application Ser. No. 14/337,744 and the related applications and patents summarized above, a novel Intelligent Backhaul Radio (or "IBR") suitable for obstructed LOS and PMP or PTP operation is described in great detail in various embodiments of those inventions. When such IBRs (or other backhaul radios) are deployed in unlicensed or lightly licensed RF spectrum bands such as the Industrial, Scientific and Medical (or "ISM") bands at, for example, 2.4-2.4835 GHz, the proposed Citizens Broadband Radio Service (or "CBRS") band at, for example, 3.55-3.7 GHz, or the Unlicensed National Information Infrastructure (or "U-NII") band at, for example, various sub-bands within 5.15-5.925 GHz, then performance of such backhaul radios may be significantly impacted by both self-interference from other such backhaul radios and from uncoordinated interference by other transmitting devices. Such uncoordinated interference sources may include government radars, wireless local area networking devices compatible with the IEEE 802.11 family of standards (or "WiFi" devices), or cordless telephones. Backhaul radios such as IBRs can advantageously mitigate the effects of such interference by exploiting the frequency, time, spatial and cancellation domains. In an exemplary backhaul radio embodiment, an IBR determines instantaneous frequency, time, spatial and cancellation domain interference mitigation techniques using a radio resource controller (or "RRC") as also described in U.S. patent application Ser. No. 14/337,744 and the related applications and patents summarized above. However, previously known techniques for determining and implementing the specific radio resource selections have at least the significant deficiency that such techniques do not account for simultaneous resource allocation across multiple of these domains and for determining the optimal arrangement of such resources while simultaneously maintaining one or more high throughput and low latency backhaul links. Thus, there is a need in the art for developing backhaul radios that will select radio resources that provide high throughput, low latency and robustness to interference in consideration of multiple aspects of the frequency, time, spatial and cancellation domains in order to maximize the link performance of backhaul radios in the presence of self-generated and uncoordinated interference sources.

For example, in conventional PTP radios, spatial and cancellation domain optimization is not available at all. In addition, such conventional PTP backhaul radios do not have resources that enable such radios to simultaneously deliver high throughput link performance and determine interference across the remaining frequency and time domains. At deployment, such conventional radios are typically set in a scan mode with the desired link offline at the radio receiver such that a user can manually determine which channels within an applicable RF band have the least amount of interference during an observation period. The user then selects a frequency channel of operation for the instant receiver within the backhaul link and such channel is used unless another user-initiated scan is made again in the future. Thus, the conventional PTP backhaul radio art does not disclose backhaul radios that will select radio resources that provide high throughput, low latency and robustness to interference in consideration of multiple aspects of the frequency, time, spatial and cancellation domains in order to maximize the link performance of backhaul radios in the presence of self-generated and uncoordinated interference sources.

For example, U.S. Pat. No. 8,462,709 discloses methods for interference measurements. However, the techniques described in U.S. Pat. No. 8,462,709 are applicable specifically to WiFi and to detection of WiFi interference in a 40 MHz channel. In contrast, for exemplary embodiments of the present invention, interference detection is performed while maintaining full link capacity, and includes detection of a multitude of signal types, including WiFi, self-interference from other backhaul radios, and unknown sources. In some exemplary embodiments, the band over which interference is measured by this invention can comprise numerous such channels each of 40 MHz or other channel bandwidth.

For example, U.S. Pat. No. 8,737,308 discloses methods to measure interference on alternate radio frequency (RF) channels. However, the methods in U.S. Pat. No. 8,737,308 are applicable to cellular systems with one device measuring interference. In contrast, for exemplary embodiments of the present invention, interference detection is performed on two transceivers within a link simultaneously, and both transceivers are also utilized for data transmission simultaneously. Thus in exemplary embodiments herein, data transmission and reception is maintained while making the interference measurements, which the prior art does not account for.

SUMMARY

The following summary of the invention is included in order to provide a basic understanding of some aspects and features of the invention. This summary is not an extensive overview of the invention and as such it is not intended to particularly identify key or critical elements of the invention or to delineate the scope of the invention. Its sole purpose is to present some concepts of the invention in a simplified form as a prelude to the more detailed description that is presented below.

Some embodiments of the claimed invention are directed to measuring interference and channel conditions in the current channel as well as alternate channels while supporting data transmission on the wireless link. Backhaul radios for measuring interference and channel conditions across a multitude of frequencies and antennas to cover all possible channels are disclosed herein. Coordination between the transmitter and receiver of such radios uses a communication protocol sent with data to start operations on the same superframe boundary, including but not limited to frequency changes and blanking portions of data-carrying superframes periodically.

Additionally, embodiments of the claimed invention are directed to simultaneously optimizing interference mitigation resources in a backhaul radio in multiple of the frequency, time, spatial and cancellation domains.

According to an aspect of the invention, a backhaul radio is disclosed that includes a plurality of receive radio frequency (RF) chains, wherein each receive RF chain is capable of converting from one of a plurality of receive RF signals to a respective one of a plurality of receive chain output signals, and wherein each said receive RF signal is characterized by at least a channel center frequency and a channel bandwidth amongst either of a multitude of possible channel center frequencies or a multitude of possible channel bandwidths, respectively; a plurality of directive gain antenna elements; and one or more selectable RF connections for selectively coupling certain of the plurality of directive gain antenna elements to certain of the plurality of receive RF chains according to a set of selective coupling settings; wherein the backhaul radio is capable of determining a measure of interference associated with each of a plurality of combinations of channel center frequency, channel bandwidth, and set of selective coupling settings; wherein the backhaul radio is capable of determining or estimating one or more performance metrics associated with each combination of channel center frequency, channel bandwidth, and set of selective coupling settings, said determining or estimating of the one or more performance metrics being based at least upon the measure of interference; and wherein the backhaul radio is capable of changing from a first combination of channel center frequency, channel bandwidth, and set of selective coupling settings to a second combination of channel center frequency, channel bandwidth, and set of selective coupling settings, said changing being based at least upon an opportunity to improve at least one of the one or more performance metrics.

The backhaul radio may further include a radio resource controller, wherein the radio resource controller is capable of setting or causing to be set specific selective couplings between the certain of the plurality of directive gain antenna elements and the certain of the plurality of receive RF chains according to the set of selective coupling settings.

The backhaul radio may further include a backhaul management system agent that is capable of setting or causing to be set certain policies relevant to the radio resource controller, wherein the backhaul management system agent is capable of exchanging information with other backhaul management system agents within other backhaul radios or with one or more backhaul management system servers.

The information that can be exchanged with said backhaul management system agent can be used at least to set or cause to be set at least one of a channel center frequency, a specific selective coupling between at least one of the certain of the plurality of directive gain antenna elements and at least one of the certain of the plurality of receive RF chains, or a channel bandwidth.

The backhaul radio may further include one or more demodulator cores, wherein each demodulator core is capable of demodulating one or more of a plurality of receive symbol streams to produce one or more receive data interface streams; a frequency selective receive path channel multiplexer, interposed between the one or more demodulator cores and at least two of the plurality of receive RF chains, wherein the frequency selective receive path channel multiplexer is capable of generating the plurality of receive symbol streams from at least two of the plurality of receive chain output signals, and wherein frequency selective receive path channel multiplexer is capable of the determining the measure of interference associated with each of the plurality of combinations of channel center frequency, channel bandwidth, and set of selective coupling settings.

Each one of the plurality of receive RF chains may include at least a vector demodulator and two analog to digital converters that are capable of producing the respective one of the plurality of receive chain output signals, each said respective one of the plurality of receive chain output signals comprised of digital baseband quadrature signals.

At least one of the plurality of receive RF chains or at least one of the one or more selectable RF connections may include at least one downconverter capable of producing an intermediate frequency (IF) signal. The frequency selective receive path channel multiplexer may include at least one of a Space Division Multiple Access (SDMA) combiner or equalizer, a maximal ratio combining (MRC) combiner or equalizer, a minimum mean squared error (MMSE) combiner or equalizer, an Eigen Beam Forming (EBF) combiner or equalizer, a receive beam forming (BF) combiner or equalizer, a Zero Forcing (ZF) combiner or equalizer, a channel estimator, a Maximal Likelihood (DL) detector, an Interference Canceller (IC), a VBLAST combiner or equalizer, a Discrete Fourier Transformer (DFT), a Fast Fourier Transformer (FFT), or an Inverse Fast Fourier Transformer (IFFT).

At least one of the one or more selectable RF connections may include at least one RF switch, and wherein at least one mapping of ports in the RF switch can be changed according to the set of selective coupling settings. At least one of the one or more selectable RF connections may include at least one RF or IF combiner or splitter with at least one adjustable path, and wherein at least one of a phase or amplitude for said at least one adjustable path can be changed according to the set of selective coupling settings.

The certain of the plurality of directive gain antenna elements that can be selectively coupled to the certain of the plurality of receive RF chains may include at least a first subset with a first polarization and a second subset with a second polarization.

Certain of the plurality of directive gain antenna elements that can be selectively coupled to the certain of the plurality of receive RF chains may be arranged on a plurality of facets with one or more directive gain antenna elements per facet, and wherein each facet is oriented at a different azimuthal angle relative to at least one other facet.

The number of directive gain antenna elements that can be selectively coupled to receive RF chains may exceed the number of receive RF chains that can accept receive RF signals from the one or more selectable RF connections.

The number of directive gain antenna elements that can be selectively coupled to receive RF chains may exceed the number of the plurality of receive symbol streams.

The measure of interference associated with each of the plurality of combinations of channel center frequency, channel bandwidth, and set of selective coupling settings may include a determination of an energy in each of a plurality of frequency bins using a Discrete Fourier Transform or a Fast Fourier Transform.

The determining the measure of interference associated with each of the plurality of combinations of channel center frequency, channel bandwidth, and set of selective coupling settings may be performed during a blanking interval. The blanking interval may include a number of transmit blocks during which one or more other backhaul radios presently in a communications link with the backhaul radio are expected to substantially inhibit transmissions.

The backhaul radio may further include an arbiter control entity, wherein the arbiter control entity is capable of sending and receiving one or more control signals or frames to and from the one or more other backhaul radios in order to mutually arrange the blanking interval.

The one or more performance metrics associated with each combination of channel center frequency, channel bandwidth may include at least one of or a weighted combination of a plurality of a signal to interference plus noise ratio (SINR), a link throughput, a latency, a jitter or a frame loss rate.

If the changing from the first combination to the second combination involves changing at least one of the channel center frequency or the channel bandwidth, then said changing may occur at a superframe boundary mutually agreed upon by the backhaul radio and one or more other backhaul radios present in a communications link with the backhaul radio.

The backhaul radio may be capable of determining a channel propagation characteristics assessment for a wireless link between at least one of one or more other backhaul radios, said channel propagation characteristics assessment associated with each of a plurality of combinations of channel center frequency, channel bandwidth, and set of selective coupling settings.

The determining or estimating the one or more performance metrics associated with each combination of channel center frequency, channel bandwidth, and set of selective coupling settings may also be based at least upon the channel propagation characteristics assessment. The determining or estimating the one or more performance metrics associated with each combination of channel center frequency, channel bandwidth, and set of selective coupling settings for at least one such combination may be based upon the channel propagation characteristics assessment as determined for a different channel center frequency within an instant operating band. The one or more performance metrics associated with each combination of channel center frequency, channel bandwidth may include at least one of a signal to interference plus noise ratio (SINR) or a link throughput, or a weighted combination of a signal to interference plus noise ratio (SINR) and a link throughput, or a weighted combination at least one of a signal to interference plus noise ratio (SINR) or a link throughput plus at least one of a latency, a jitter or a frame loss rate.

The backhaul radio may further include one or more adjunct antenna elements, wherein at least one of the one or more adjunct antenna elements has a larger azimuthal coverage pattern than any of the plurality of directive gain antenna elements that can be selectively coupled to at least one of the plurality of receive RF chains.

The backhaul radio may be capable of at least partially cancelling an interfering signal received at at least one of the one or more adjunct antenna elements within at least one of a plurality of receive symbol streams, and wherein the determining or estimating the one or more performance metrics associated with each combination of channel center frequency, channel bandwidth, and set of selective coupling settings is also based on an estimated improvement due to said at least partially cancelling.

At least one of the plurality of combinations of channel center frequency, channel bandwidth, and set of selective coupling settings may include a channel center frequency within the 5 GHz UNII band. At least one of the one or more adjunct antenna elements can be utilized for Dynamic Frequency Selection (DFS). Successive ones of the blanking interval may be scheduled so as to appear non-uniform or pseudo-random to a DFS radar detector.

The backhaul radio may further include an arbiter control entity, wherein the arbiter control entity is capable of sending and receiving one or more control signals or frames to and from the one or more other backhaul radios in order to mutually arrange the changing at least one of the channel center frequency or the channel bandwidth.

BRIEF DESCRIPTION OF THE DRAWINGS

The accompanying drawings, which are incorporated into and constitute a part of this specification, illustrate one or more examples of embodiments and, together with the description of example embodiments, serve to explain the principles and implementations of the embodiments.

DETAILED DESCRIPTION

Figure 1:
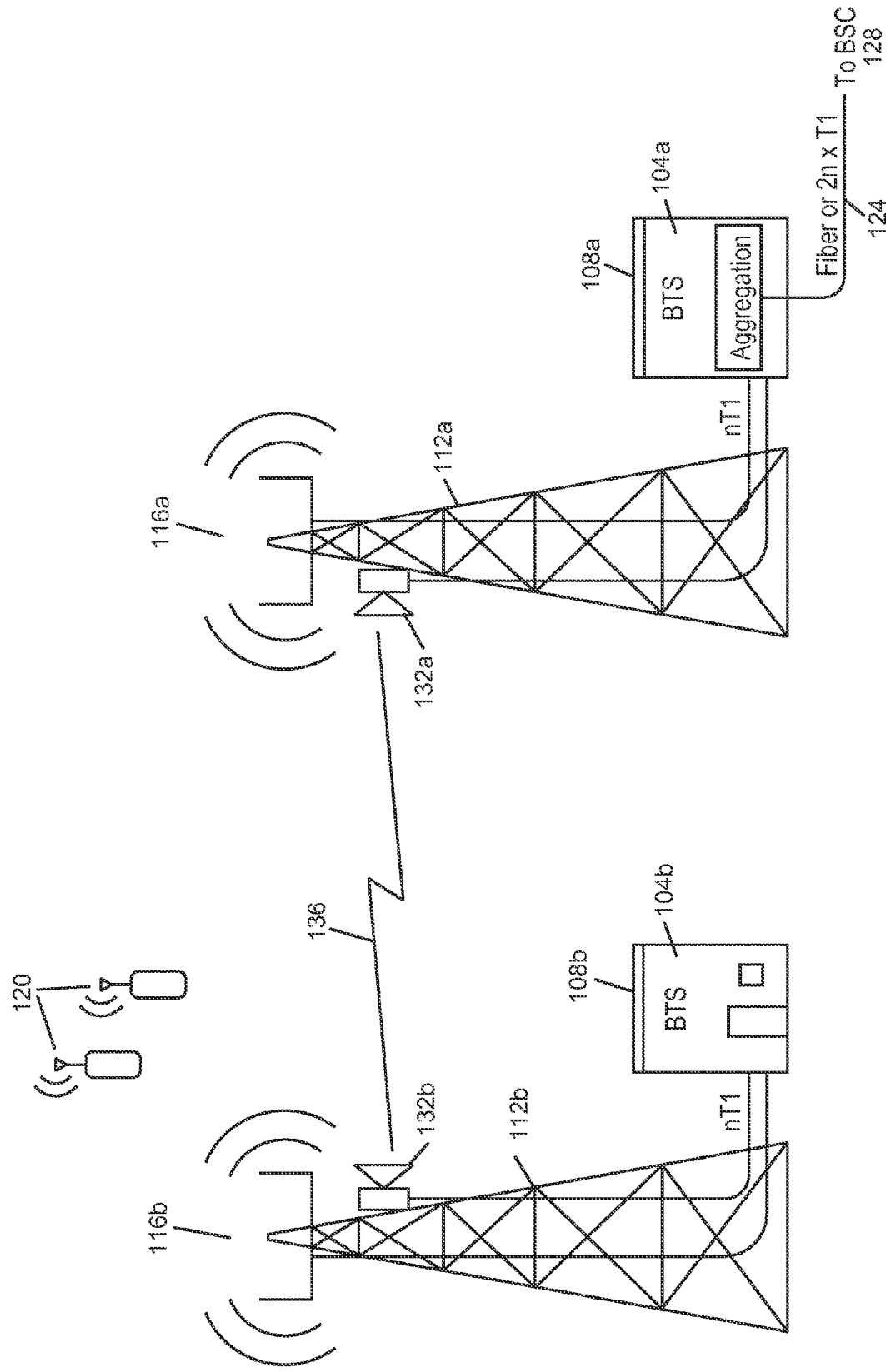
FIG. 1 is an illustration of conventional point to point (PTP) radios deployed for cellular base station backhaul with unobstructed line of sight (LOS).
Figure 2:
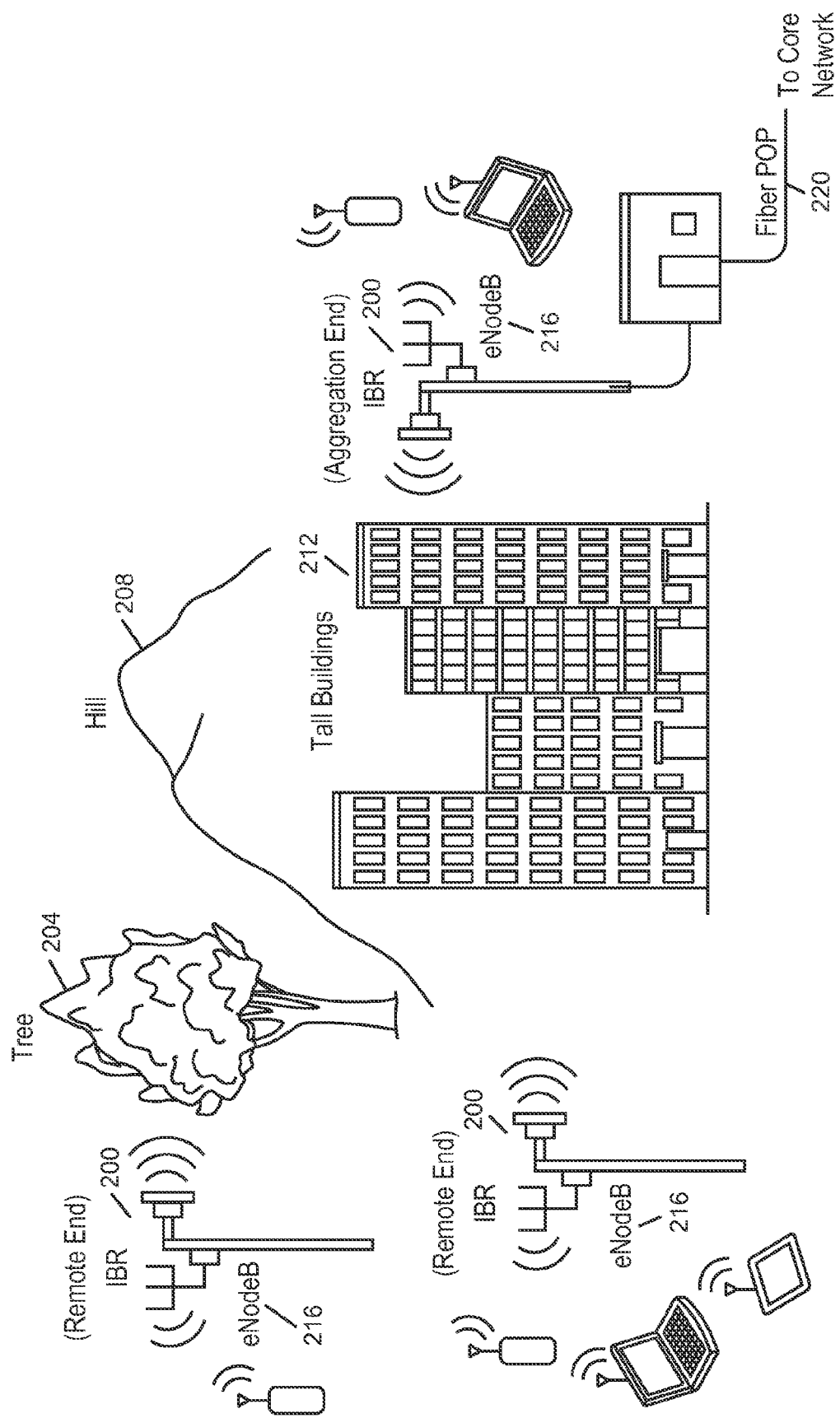
FIG. 2 is an illustration of intelligent backhaul radios (IBRs) deployed for cellular base station backhaul with obstructed LOS according to one embodiment of the invention.

FIG. 2 illustrates deployment of intelligent backhaul radios (IBRs) in accordance with an embodiment of the invention. As shown in FIG. 2, the IBRs 200 are deployable at street level with obstructions such as trees 204, hills 208, buildings 212, etc. between them. The IBRs 200 are also deployable in configurations that include point to multipoint (PMP), as shown in FIG. 2, as well as point to point (PTP). In other words, each IBR 200 may communicate with more than one other IBR 200.

For 3G and especially for $4^{th}$ Generation (4G), cellular network infrastructure is more commonly deployed using "microcells" or "picocells." In this cellular network infrastructure, compact base stations (eNodeBs) 216 are situated outdoors at street level. When such eNodeBs 216 are unable to connect locally to optical fiber or a copper wireline of sufficient data bandwidth, then a wireless connection to a fiber "point of presence" (POP) requires obstructed LOS capabilities, as described herein.

For example, as shown in FIG. 2, the IBRs 200 include an Aggregation End IBR (AE-IBR) and Remote End IBRs (RE-IBRs). The eNodeB 216 associated with the AE-IBR is typically connected locally to the core network via a fiber POP 220. The RE-IBRs and their associated eNodeBs 216 are typically not connected to the core network via a wireline connection; instead, the RE-IBRs are wirelessly connected to the core network via the AE-IBR. As shown in FIG. 2, the wireless connections between the IBRs include obstructions (i.e., there may be an obstructed LOS connection between the RE-IBRs and the AE-IBR).

Figure 3:
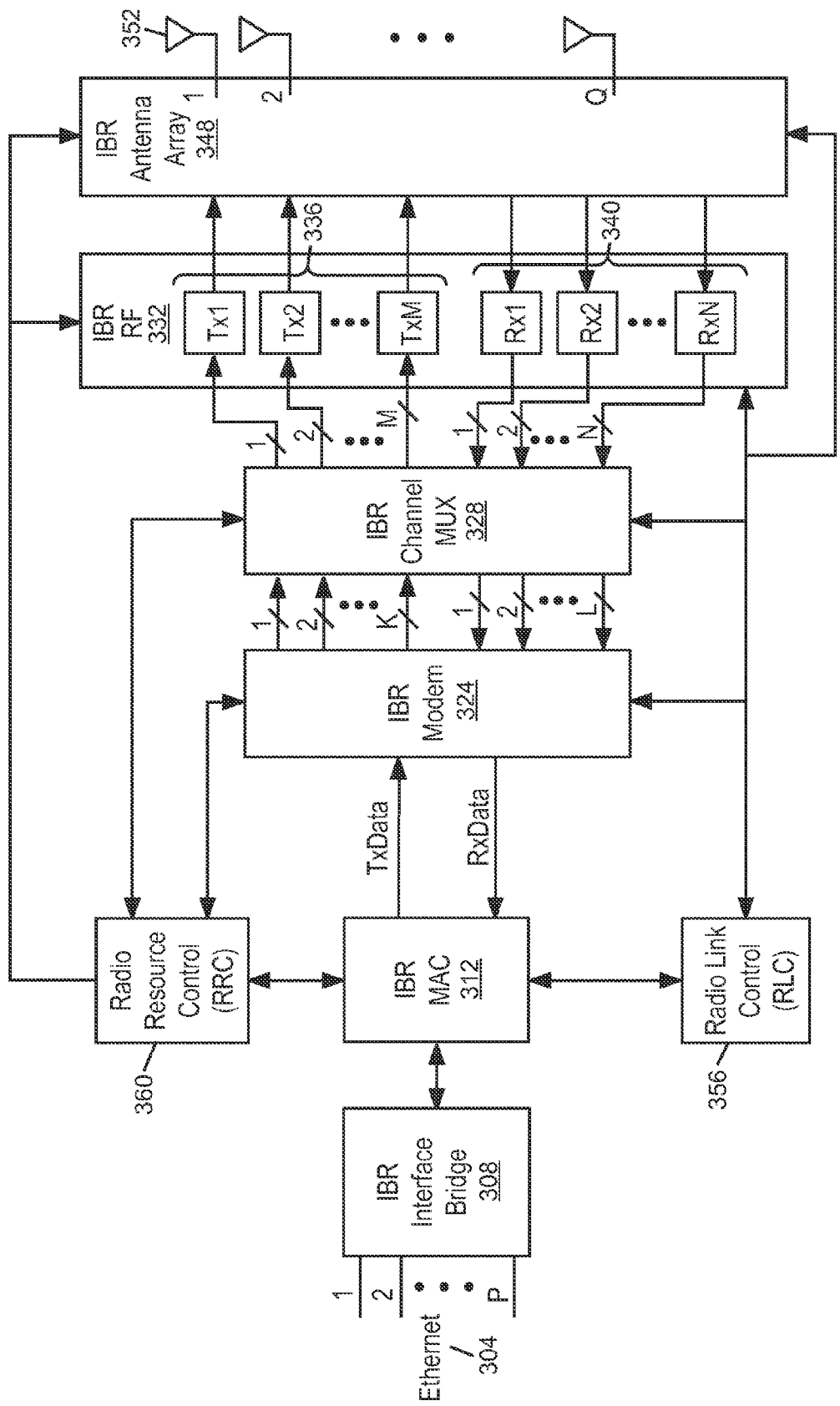
FIG. 3 is a block diagram of an IBR according to one embodiment of the invention.
Figure 7:
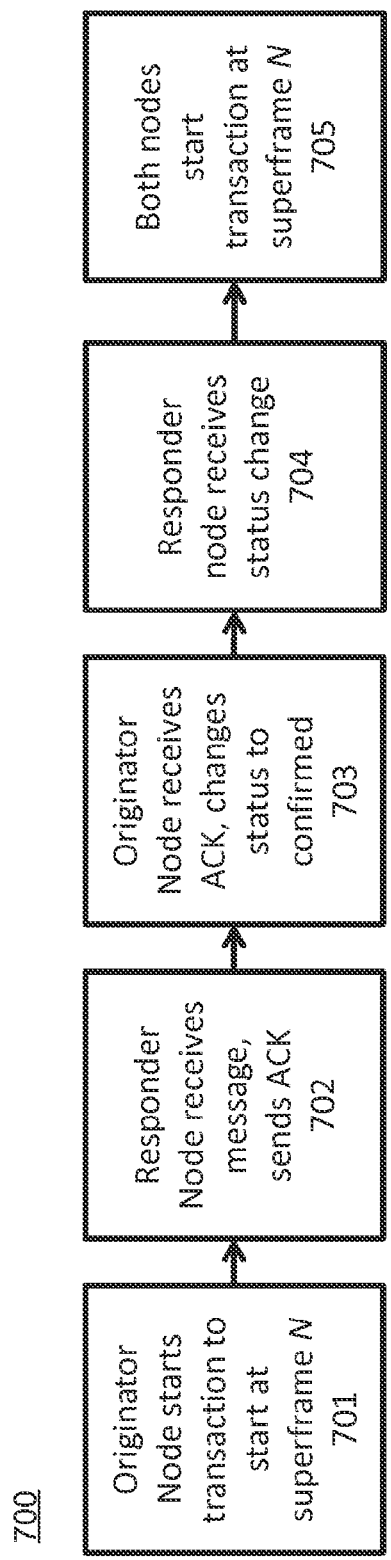
FIG. 7 shows a procedure for a bi-directional transaction from an originator node to one or more responder nodes according to one embodiment of the invention.

FIG. 3 illustrates an exemplary embodiment of the IBRs 200 shown in FIG. 2. In FIG. 3, the IBRs 200 include interfaces 304, interface bridge 308, MAC 312, modem 324, channel MUX 328, RF 332, which includes Tx1 . . . TxM 336 and Rx1 . . . RxN 340, antenna array 348 (includes multiple antennas 352), a Radio Link Controller (RLC) 356 and a Radio Resource Controller (RRC) 360. The IBR may optionally include an Intelligent Backhaul Management System (IBMS) agent as shown in FIG. 7 of U.S. patent application Ser. No. 14/337,744. It will be appreciated that the components and elements of the IBRs may vary from that illustrated in FIG. 3. U.S. patent application Ser. No. 14/337,744 and the related applications and patents summarized above describe in detail the various elements of the IBR including their structural and operational features in numerous different embodiments both as depicted in FIG. 3 and as depicted with various additional elements not shown in FIG. 3. A brief summary of certain elements of the IBR is also provided herein.

The external interfaces of the IBR (i.e., the IBR Interface Bridge 308 on the wireline side and the IBR Antenna Array 348 (including antennas 352) on the wireless side) are a starting point for describing some fundamental differences between the numerous different embodiments of the IBR 200 and either conventional PTP radios or other commonly known radio systems, such as those built to existing standards including 802.11n (WiFi), 802.11ac (WiFi), 802.16e (WiMax) or 4G LTE.

In some embodiments, the IBR Interface Bridge 308 physically interfaces to standards-based wired data networking interfaces 304 as Ethernet 1 through Ethernet P. "P" represents a number of separate Ethernet interfaces over twisted-pair, coax or optical fiber. The IBR Interface Bridge 308 can multiplex and buffer the P Ethernet interfaces 304 with the IBR MAC 312. In exemplary embodiments, the IBR Interface Bridge 308 preserves "Quality of Service" (QoS) or "Class of Service" (CoS) prioritization as indicated, for example, in IEEE 802.1q 3-bit Priority Code Point (PCP) fields within the Ethernet frame headers, such that either the IBR MAC 312 schedules such frames for transmission according to policies configured within or communicated to the IBR 200, or the IBR interface bridge 308 schedules the transfer of such frames to the IBR MAC 312 such that the same net effect occurs. In other embodiments, the IBR interface bridge 308 also forwards and prioritizes the delivery of frames to or from another IBR over an instant radio link based on Multiprotocol Label Switching (MPLS) or Multiprotocol Label Switching Transport Profile (MPLS-TP). U.S. patent application Ser. No. 14/337,744 provides additional description of exemplary embodiments of the interfaces 304 and the interface bridge 308 of the IBR 200. U.S. patent application Ser. No. 13/632,993 provides additional description of exemplary embodiments of an IBMS that includes an IBMS Agent in communication with or IBMS components and the IBR Interface Bridge 308 as well as MAC 312 and/or RRC 360. U.S. patent application Ser. No. 13/632,993 also describes an IBR with an integrated Carrier Ethernet switch.

Figure 4:
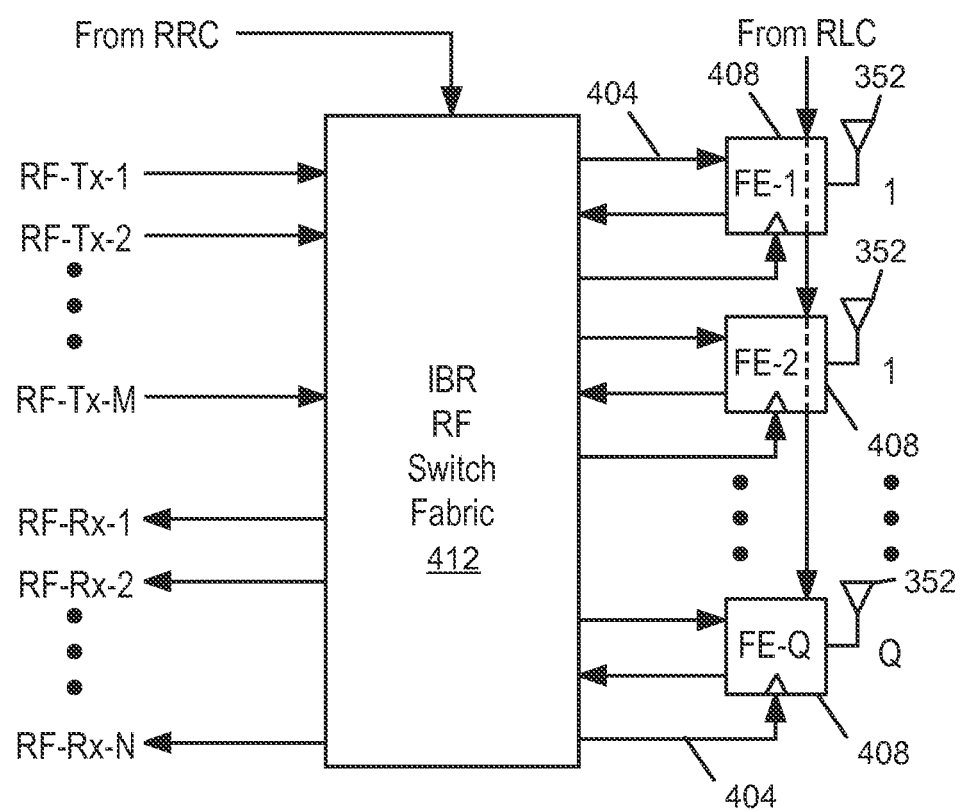
FIG. 4 is a block diagram of an IBR antenna array according to one embodiment of the invention.

FIG. 4 illustrates an exemplary embodiment of an IBR Antenna Array 348. FIG. 4 illustrates an antenna array having Q directive gain antennas 352 (i.e., where the number of antennas is greater than 1). In FIG. 4, the IBR Antenna Array 348 includes an IBR RF Switch Fabric 412, RF interconnections 404, a set of Front-ends 408 and the directive gain antennas 352. The RF interconnections 404 can be, for example, circuit board traces and/or coaxial cables. The RF interconnections 404 connect the IBR RF Switch Fabric 412 and the set of Front-ends 408. Each Front-end 408 is associated with an individual directive gain antenna 352, numbered consecutively from 1 to Q.

U.S. patent application Ser. No. 14/337,744, U.S. patent application Ser. No. 14/336,958, and U.S. patent application Ser. No. 14/108,200 provide additional description of the Front-end 408 and various embodiments thereof as applicable to different IBR duplexing schemes such as Time Division Duplexing (TDD), Frequency Division Duplexing (FDD) and Zero Division Duplexing (ZDD). For example, with TDD embodiments where certain directive gain antenna elements 352 are used for both transmit and receive at different times, then Front-end 408 may include a transmit/receive switch, one or more RF low pass and/or bandpass filters, and either a low-noise amplifier (LNA) in the receive path or a power amplifier (PA) in the transmit path. Similarly, with FDD embodiments where certain directive gain antenna elements 352 are used for both transmit and receive at the same time, then Front-end 408 may include a duplex filter, one or more additional RF low pass and/or bandpass filters, and either a low-noise amplifier (LNA) in the receive path or a power amplifier (PA) in the transmit path. Another common embodiment for FDD has certain directive gain antenna elements 352 used only for transmit and then Front-end 408 for such transmit antenna elements would have a PA and one or more RF filters for a transmit FDD sub-band and has certain directive gain antenna elements 352 used only for receive and then Front-end 408 for such receive antenna elements would have an LNA and one or more RF filters for a receive FDD sub-band. In most ZDD embodiments, certain directive gain antenna elements 352 are used only for transmit and others only for receive with respective Front-ends as described for FDD except that the RF filters overlap in the frequency domain for both transmit and receive (i.e. no separate transmit and receive sub-bands).

Note that each antenna 352 has a directivity gain Gq. For IBRs intended for fixed location street-level deployment with obstructed LOS between IBRs, whether in PTP or PMP configurations, each directive gain antenna 352 may use only moderate directivity compared to antennas in conventional PTP systems at a comparable RF transmission frequency. As described in greater detail in U.S. patent application Ser. No. 14/337,744, U.S. patent application Ser. No. 14/336,958, U.S. patent application Ser. No. 14/197,158, and U.S. patent application Ser. No. 14/108,200, typical values of Gq are on the order of 10 to 20 dBi for each antenna at RF transmission frequencies below 10 GHz.

In the IBR Antenna Array 348, the total number of individual antenna elements 352, Q, is at least greater than or equal to the larger of the number of RF transmit chains 336, M, and the number of RF receive chains 340, N. In some embodiments, some or all of the antennas 352 may be split into pairs of polarization diverse antenna elements realized by either two separate feeds to a nominally single radiating element or by a pair of separate orthogonally oriented radiating elements. In some embodiments, certain antenna elements 352 may be configured with different antenna gain Gq and/or radiation patterns compared to others in the same IBR. Also, in many embodiments, such as for those employing FDD or ZDD, U.S. patent application Ser. No. 14/337,744, U.S. patent application Ser. No. 14/336,958, U.S. patent application Ser. No. 14/197,158, and U.S. patent application Ser. No. 14/108,200 provide additional description of advantageous arrangements of separate transmit and receive antenna subsets with the total set Q of individual antenna elements 352.

The IBR RF Switch Fabric 412 provides selectable RF connections between certain RF-Tx-m and/or certain RF-Rx-n to the various individual antenna elements 352 via various front-end 408 embodiments. In exemplary embodiments, the RF Switch Fabric 412 is comprised of one or more RF switches where each RF switch has a selective set of one or mappings between the two or more RF ports on each switch. Note specifically that in certain embodiments the individual antenna elements 352 are coupled via a transmit-only front-end and/or the IBR RF Switch Fabric 412 to only a transmit chain output RF-Tx-m or coupled via a receive-only front-end and/or the IBR RF Switch Fabric 412 to only a receive chain output RF-Rx-n to advantageously enable separate optimization of the receive antenna array from that of the transmit antenna array. U.S. patent application Ser. No. 14/337,744, U.S. patent application Ser. No. 14/336,958, and U.S. patent application Ser. No. 14/108,200 provide additional description of different embodiments of the IBR RF Switch Fabric 412 as applicable to TDD, FDD and ZDD in different product configurations. Note further that other IBR embodiments may provide selectable RF connections between certain RF-Tx-m and/or certain RF-Rx-n to the various individual antenna elements 352 via various front-end 408 embodiments with structures different than the IBR RF Switch Fabric 412, as also disclosed at least in U.S. patent application Ser. No. 14/337,744. For example, certain IBR embodiments may utilize selective coupling structures between antenna elements and RF chains that comprise combiners or splitters where the phase and/or amplitude of a transmit or receive signal in certain paths of a combiner or splitter can be different from that of other paths. In some embodiments, such selective coupling structures may include one or more upconverters or downconverters such that at least one splitter or combiner may include at least one path at an intermediate frequency (IF). Alternatively, in some embodiments one or more switches in the implementation of the selectable RF connections may also operate at IF. In any of these embodiments, the actual instant selective coupling parameters such as a switch setting, or a path phase and/or an amplitude, or a splitting or combining path selection may be characterized by an appropriate set of selective coupling settings. In some IBR embodiments, the Radio Resource Control (RRC) 360 may generate or cause to be generated such a set of selective coupling settings.

With reference back to FIG. 3, the IBR RF 332 also includes transmit RF and receive RF chains 336, 340. In one embodiment, each element of transmit RF chain 336 takes a transmit chain input signal such as digital baseband quadrature signals $I_{Tm}$ and $Q_{Tm}$ and then converts them to a transmit RF signal RF-Tx-m at an RF carrier frequency typically below 10 GHz. Similarly, each element of receive RF chain 340 converts a receive RF signal RF-Rx-n at an RF carrier frequency typically below 10 GHz to a receive chain output signal such as digital baseband quadrature signals $I_{Rn}$ and $Q_{Rn}$. In exemplary embodiments, each receive RF chain comprises at least a vector demodulator and two analog to digital converters that are capable of producing such digital baseband quadrature signals $I_{Rn}$ and $Q_{Rn}$. Similarly, in exemplary embodiments, each transmit RF chain comprises at least a vector modulator and two digital to analog converters that are capable of operating from such digital baseband quadrature signals $I_{Tm}$ and $Q_{Tm}$. In other embodiments, the transmit RF and/or receive RF chains may operate at or operate with an intermediate frequency (or IF) that is also respectively upconverted or downconverted to the instant RF carrier frequency. Such upconverters or downconverters may be comprised within such transmit RF or receive RF chains. In some embodiments, such upconverters or downconverters may be comprised within the selectable RF connections as described above.

Other IBR elements include the IBR MAC 312, the Radio Link Control (RLC) 356, the Radio Resource Control (RRC) 360 and the optional IBMS Agent. Although IBR embodiments are possible wherein the MAC 312, RLC 356, RRC 360 and the optional IBMS Agent are distinct structural entities, more commonly IBRs are realized wherein the MAC 312, RLC 356, RRC 360 and the optional IBMS Agent as well as portions of the IBR Interface Bridge 308 are software modules executing on one or more microprocessors. Note also that in some IBR embodiments that use of a "Software Defined Radio" (SDR) for the IBR Modem 324 and/or IBR Channel MUX 328 or portions thereof may also be realized in software executing on one or more microprocessors. Typically in SDR embodiments, the one or more microprocessors used for elements of the PHY layer are physically separate from those used for the MAC 312 or other layers and are physically connected or connectable to certain hardware cores such as FFTs, Viterbi decoders, DFEs, etc. As SDR processing power increases over time, functions traditionally implemented in hardware cores advantageously migrate to the SDR processor cores as software modules for greater implementation flexibility.

The RRC 360 and RLC 356 may interact with the IBR MAC 312 and various elements of the IBR PHY at either the instant IBR or other IBRs in the instant link via "normal" frame transfers, direct local control signals via the conceptual IBR Control plane, or certain fields within a link control block that is transmitted periodically in certain superframes. Both the RRC 360 and the RLC 356 may execute concurrent control loops with the respective goals of optimizing radio resource allocations and optimizing radio link parameters for current resources in view of the dynamic propagation environment conditions (including uncoordinated interference if applicable), IBR loading, and possibly system-wide performance goals (via the optional IBMS Agent or other IBR to IBR control communications links). It is instructive to view the RLC 356 as an "inner loop" optimizing performance to current policies and radio resource allocations for each active link and to view the RRC 360 as an "outer loop" determining if different policies or radio resource allocations are desirable to meet overall performance goals for all IBRs currently interacting with each other (intentionally or otherwise). Typically both the RRC 360 and the RLC 356 are implemented as software modules executing on one or more processors.

The primary responsibility of the RLC 356 in exemplary IBRs is to set or cause to be set the current transmit Modulation and Coding Scheme (MCS) and output power for each active link. In an exemplary embodiment, the RLC 356 causes the transmit power control (TPC) of the IBR to be maintained both in a relative sense amongst active links, particularly of interest for the AE-IBR in a PMP configuration, and also in an overall sense across all transmits chains and antennas. In other embodiments, the RRC performs some or all of the transmit power control (TPC) functionality.

In some embodiments, the RLC 356 can determine its MCS and TPC selections across active links based on information from various sources within the IBR. For example, the IBR MAC can deliver RLC control frames from other IBRs with information from such other IBRs (for example, RSSI, decoder metrics, FCS failure rates, etc.) that is useful in setting MCS and TPC at the transmitting IBR. Additionally, such RLC control frames from an associated IBR may directly request or demand that the RLC in the instant IBR change its MCS and/or TPC values for transmit directly on either a relative or absolute basis. U.S. patent application Ser. No. 14/337,744 and U.S. patent application Ser. No. 14/108,200 provide additional description of different embodiments of the RLC 356 as applicable to TDD, FDD and ZDD in different product configurations. In other embodiments of the present invention, the link control block may be used in place of or in addition to such control frames to carry such information.

The primary responsibility of the RRC 360 is to set or cause to be set at least the one or more active RF carrier frequencies (or alternatively, active RF channel center frequencies), the one or more active channel bandwidths, the choice of transmit and receive channel equalization and multiplexing strategies, the configuration and assignment of one or more modulated streams amongst one of more modulator cores, the number of active transmit and receive RF chains, and the selection of certain antenna elements and their mappings to the various RF chains (the set of selective coupling settings). Optionally, the RRC may also set or cause to be set the superframe timing, the cyclic prefix length, and/or the criteria by which blocks of Training Pilots are inserted. The RRC 360 allocates portions of the IBR operational resources, including time multiplexing of currently selected resources, to the task of testing certain links between an AE-IBR and one or more RE-IBRs. The RRC 360 evaluates such tests by monitoring at least the same link quality metrics as used by the RLC 656. Additionally, in some embodiments, additional RRC-specific link testing metrics are also used. The RRC 360 can also exchange control frames or control signaling using the link control block with a peer RRC at the other end of an instant link to, for example, provide certain link testing metrics or request or direct the peer RRC to obtain link specific testing metrics at the other end of the instant link for communication back to RRC 360.

In some embodiments, the RRC 360 causes changes to current resource assignments in response to tested alternatives based on policies that are configured in the IBR and/or set by the optional IBMS Agent. An exemplary policy includes selecting resources based on link quality metrics predicted to allow the highest throughput MCS settings at lowest TPC value. Additional exemplary policies may factor in minimizing interference by the instant link to other AE-IBR to RE-IBR links (or other radio channel users such as conventional PTP radios) either detected at the instant IBRs or known to exist at certain physical locations nearby as set in configuration tables or communicated by the optional IBMS Agent or other IBR to IBR control communications links as described, for example, in co-pending U.S. patent application Ser. No. 14/098,456, the entirety of which is hereby incorporated by reference. For example, U.S. patent application Ser. No. 14/098,456 discloses exemplary systems and methods for control communications links in the form of inline or embedded signals that may be suitable for exchange of control information between IBRs that otherwise lack any IBR to IBR communication path. Such policies may also be weighted proportionately to reach a blended optimum choice amongst policy goals or ranked sequentially in importance.

In some embodiments, for either PTP or PMP deployment configurations, the selection of either the one or more active RF carrier frequencies used by the RF chains of the IBR RF, the one or more active channel bandwidths used by the IBR MAC, IBR Modem, IBR Channel MUX and IBR RF, the superframe timing, the cyclic prefix length, or the insertion policy for blocks of Training Pilots is determined at the AE-IBR for any given link. The RE-IBR in such an arrangement can request, for example, an RF carrier frequency or channel bandwidth change by the AE-IBR by sending an RRC control frame in response to current link conditions at the RE-IBR and its current RRC policies. Whether in response to such a request from the RE-IBR or due to its own view of current link conditions and its own RRC policies, an AE-IBR sends the affected RE-IBRs an RRC control frame specifying at least the parameters for the new RF frequency and/or channel bandwidth of the affected links as well as a proposed time, such as a certain superframe sequence index, at which the change-over will occur (or alternatively, denies the request). The AE-IBR then makes the specified change after receiving confirmation RRC control frames from the affected RE-IBRs or sends a cancellation RRC control frame if such confirmations are not received before the scheduled change. In some embodiments of the present invention, RRC may send such information on the link control block instead of or in addition to using control frames.

An RE-IBR typically attempts to utilize all available modulator and demodulator cores and streams as well as all available RF chains to maximize the robustness of its link to a particular AE-IBR. In an RE-IBR embodiment where at least some redundancy in antenna elements amongst space, directionality, orientation, polarization and/or RF chain mapping is desirable, the primary local RRC decision is then to set these various antenna selectivity options. In other embodiments the AE-IBR and RE-IBR optimize their resource allocations independently such that there is little distinction between the RRC strategies at the AE-IBR versus the RE-IBR. U.S. patent application Ser. No. 14/337,744, U.S. patent application Ser. No. 14/336,958, and U.S. patent application Ser. No. 14/108,200 provide additional description of different embodiments of the RRC 360 as applicable to TDD, FDD and ZDD in different product configurations.

The specific details of the IBR Modem 324 and IBR Channel MUX 328 depend somewhat on the specific modulation format(s) deployed by the IBR. In general, the IBR requires a modulation format suitable for a broadband channel subject to frequency-selective fading and multipath self-interference due to the desired PHY data rates and ranges in obstructed LOS propagation environments. Many known modulation formats for such broadband channels are possible for the IBR. Two such modulation formats for the IBR are (1) Orthogonal Frequency Division Multiplexing (OFDM) and (2) Single-Carrier Frequency Domain Equalization (SC-FDE). Both modulation formats are well known, share common implementation elements, and have various advantages and disadvantages relative to each other. U.S. patent application Ser. No. 14/337,744 provides additional detail regarding OFDM and SC-FDE as applicable to various IBR embodiments.

The specific details of the IBR Modem 324 and IBR Channel MUX 328 also depend somewhat on the specific antenna array signal processing format(s) deployed by the IBR. In general, the IBR utilizes multiple antennas and transmit and/or receive chains, which can be utilized advantageously by several well-known baseband signal processing techniques that exploit multipath broadband channel propagation. Such techniques include Multiple-Input, Multiple-Output (MIMO), MIMO Spatial Multiplexing (MIMO-SM), beamforming (BF), maximal ratio combining (MRC), and Space Division Multiple Access (SDMA). U.S. patent application Ser. No. 14/337,744 provides additional detail regarding such techniques as applicable to various IBR embodiments.

In many embodiments, the IBR Modem 324 comprises one or modulator cores each of which comprises such functional elements as scramblers, encoders, interleavers, stream parsers, symbol groupers and symbol mappers. At a high level, each modulator core within the IBR Modem 324 typically transforms a data stream from the IBR MAC 312 into a symbol stream that can be passed to the IBR Channel MUX 328. Similarly, in many embodiments, the IBR Modem 324 also comprises one or demodulator cores each of which comprises such functional elements as descramblers, decoders, deinterleavers, stream multiplexers, and soft decision symbol demappers. At a high level, each demodulator core within the IBR Modem 324 typically transforms a stream of estimated receive symbols, such as represented by a Log-Likelihood Ratio (LLR), from the IBR Channel MUX 328 into a data stream that can be passed to the IBR MAC 312. U.S. patent application Ser. No. 14/337,744, U.S. patent application Ser. No. 14/336,958, and U.S. patent application Ser. No. 14/108,200 provide additional description of different embodiments of the IBR Modem 324 as applicable to TDD, FDD and ZDD in different product configurations.

In many embodiments, the IBR Channel MUX 328 comprises a transmit path channel multiplexer that may or may not be frequency selective and that in turn may comprise such functional elements as block assemblers, transmit channel equalizers, transmit multiplexers, cyclic prefix adders, block serializers, transmit digital front ends, preamble inserters, and pilot inserters. At a high level, the transmit path of the IBR Channel MUX 328 transforms one or more symbol streams from the IBR Modem 324 into inputs for the one or more transmit chains each comprised of baseband symbol samples. Similarly, in many embodiments, the IBR Channel MUX 328 also comprises a frequency selective receive path channel multiplexer that in turn may comprise such functional elements as synchronizers, receive digital front ends, cyclic prefix removers, channel equalizer coefficients generators, receive channel equalizers, receive stream multiplexers and complex Discrete Fourier Transformers (DFT). Such exemplary frequency selective receive path channel multiplexers may also comprise at least one of a Space Division Multiple Access (SDMA) combiner or equalizer, a maximal ratio combining (MRC) combiner or equalizer, a minimum mean squared error (MMSE) combiner or equalizer, an Eigen Beam Forming (EBF) combiner or equalizer, a receive beam forming (BF) combiner or equalizer, a Zero Forcing (ZF) combiner or equalizer, a channel estimator, a Maximal Likelihood (DL) detector, an Interference Canceller (IC), a VBLAST combiner or equalizer, a Discrete Fourier Transformer (DFT), a Fast Fourier Transformer (FFT), or an Inverse Fast Fourier Transformer (IFFT). At a high level, the receive path of the IBR Channel MUX 328 transforms the outputs of the one or more receive chains each comprised of baseband symbol samples into one or more streams of estimated receive symbols for input into the IBR Modem 324. U.S. patent application Ser. No. 14/337,744, U.S. patent application Ser. No. 14/336,958, and U.S. patent application Ser. No. 14/108,200 provide additional description of different embodiments of the IBR Channel MUX 328 as applicable to TDD, FDD and ZDD in different product configurations.

In exemplary embodiments, the IBR MAC 312 comprises such functional elements as a management entity, a Tx buffer and scheduler, a control entity, an Rx buffer, a frame check sum (FCS) generator, a header generator, a header analyzer and an FCS analyzer. U.S. patent application Ser. No. 14/337,744, U.S. patent application Ser. No. 14/336,958, and U.S. patent application Ser. No. 14/108,200 provide additional description of different embodiments of the IBR MAC 312 as applicable to TDD, FDD and ZDD in different product configurations.

Additional details regarding numerous optional functional components and regarding additional exemplary embodiments of the IBR are provided in commonly assigned U.S. patent application Ser. No. 14/337,744 and U.S. Pat. Nos. 8,811,365, 8,311,023 and 8,238,318, U.S. patent application Ser. No. 14/336,958 and U.S. Pat. Nos. 8,824,442 and 8,467,363, U.S. patent application Ser. No. 14/197,158, U.S. patent application Ser. No. 13/632,993 and U.S. Pat. Nos. 8,830,943, 8,761,100, and 8,300,590, and U.S. patent application Ser. No. 14/108,200 and U.S. Pat. Nos. 8,638,839 and 8,422,540, U.S. patent application Ser. No. 14/151,190, and U.S. patent application Ser. No. 14/098,456, the disclosures of which are hereby incorporated herein by reference in their entirety for all of the above.

Additional details regarding the application of interference mitigation procedures applied specifically to IBRs are also provided in U.S. Provisional Patent Application Ser. No. 61/910,194 from which this application claims priority and the disclosure of which is hereby incorporated herein by reference in its entirety.

The IBR at startup and during normal operation may scan at the receiver of each link for the minimally interfered frequency spectrum within the available receiver band of operation. The IBR may optimize its channel bandwidth and channel center frequency to correspond to minimally interfered frequency spectrum. In some embodiments, multiple channels within the available receiver band of operation may be selected simultaneously based on non-contiguous channel aggregation. The IBR performing this optimization at its receiver may communicate this optimal frequency channel characteristics to the transmitting IBR in its instant link so that the transmitting IBR adopts these optimal frequency channel characteristics in subsequent transmissions. In some embodiments, at startup the IBR may communicate to the transmitting IBR in its instant link at the minimum supported channel bandwidth to increase the probability that the transmitting IBR in its instant link successfully receives the communication with this optimal frequency channel characteristics information. In this way, the IBR mitigates interference in the frequency domain.

In FDD and ZDD embodiments, the receivers at both ends of an instant IBR link, whether point-to-point (PTP or P2P) or multi-point-to-point (PMP or MP2P), may perform these receiver channel scans and other interference mitigation techniques described herein independently to advantageously optimize the use of minimally interfered frequency spectrum or other receiver resources at each end of the link separately since each end in a backhaul application is typically far enough apart that the interference environment is different at each receiver.

The IBR also mitigates intermittent interference in the combined frequency and time domains by changing one or both of the channel center frequency and channel bandwidth (possibly for multiple aggregated channels individually) as a function of time as interference conditions change in the time domain. The timescale at which these changes occur can be, for example, several superframes, on a superframe by superframe basis, on a block by block basis, or within a block as may be practical given the hardware limitations of a particular IBR implementation.

For example, if such channel bandwidth and center frequency change is made on a superframe basis, then in one embodiment, an IBR may signal the desired change either via a MAC Control frame sent in the previous superframe or by certain control flags set within a given transmit block or symbol block such as a link control block. In this example, the time to effect the change in channel bandwidth and/or center frequency may occur in one or more blank or non-payload transmit blocks at the end of a superframe so that blocks are not sent or received in error while the IBR Channel MUX or the transmit and/or receive RF chains are transitioning their channel bandwidth or center frequency.

In exemplary IBR embodiments, the superframe is typically on the order of 200 to 2000 μs duration and composed of transmit blocks of typically 10 to 30 μs duration. Typically each IBR superframe comprises multiple transmit blocks including at least one preamble block that may be used at least for synchronization and/or channel estimation (or for channel propagation characteristics assessment), at least one link control block that provides information such as the Modulation and Coding Scheme (or "MCS") for the data blocks in the instant or subsequent superframe, and at least several data blocks that can comprise control, management and/or user information bits. IBRs may advantageously optimize the superframe duration at either or both of startup or dynamically during operation to increase superframe duration at times of minimal interference when infrequent frequency agility in channel bandwidth and/or center frequency is required; thereby, minimizing the non-payload overhead associated with short duration superframes.

Alternatively, IBRs may advantageously optimize the superframe duration at either or both of startup or dynamically during operation to decrease superframe duration at times of significant interference that require continuous frequency agility in channel bandwidth and/or center frequency; thereby, minimizing the time required to make a channel bandwidth and channel center frequency change to correspond to minimally interfered frequency spectrum.

In other embodiments, IBRs may change channel center frequency and channel bandwidth on a block by block basis by signaling such changes in an FDD or ZDD scheme with control flags appended to a transmit block to minimize processing latency in receiving such control flags and making the signaled change. Upon changing channel bandwidth and/or center frequency, IBRs may use an immediate preamble block transmission to enable determination of updated channel estimation or may derive a temporary estimation for use until the next regularly scheduled preamble by interpolating, extrapolating and/or recalling from previously stored channel estimation.

In exemplary IBR embodiments, interference mitigation in the time domain is also enhanced by block level retransmission. This enables otherwise unmitigated interference that causes block errors at the receiver to be corrected at minimal latency to the affected data frame(s). Preferably in FDD and ZDD systems, an ACK or NACK is sent as a control flag with a block identifier to minimize latency in causing a transmitter to re-transmit a buffered block. In certain embodiments, such control flags and identifiers are appended to transmit blocks after all bit processing operations to minimize the block processing latency associated with such function as encoding, interleaving, scrambling, encrypting, etc. and their inverse operations at the receiver.

IBRs advantageously use a multitude of diverse receive antennas. In IBRs, the number of receive RF chains, each of which can be coupled to at least one distinct receive antenna, equals or exceeds the number of receive symbol streams and the number of distinct receive antennas that collectively provide diversity in the spatial domain exceeds the number of receive symbol streams. The spatial domain diversity may be achieved by distinct receive antennas that are i) separated physically in space, by at least one half wavelength but preferably by multiple wavelengths, ii) separated in directional orientation, in either azimuth or elevation but preferably at least such that their respective azimuthal beam widths do not substantially overlap, or iii) separated in polarization such as vertical and horizontal or other known orthogonal polarizations. Many embodiments of the IBR use a combination of at least two of the above spatial domain diversity alternatives and some embodiments of the IBR use a combination of spatial domain diversity based upon all three—physical separation, azimuthal orientation, and orthogonal polarization.

Exemplary antenna arrays that embody the combination of spatial domain diversity based upon physical separation, azimuthal orientation, and orthogonal polarization are shown in FIGS. 52A, 52B, 52C, 53A, 53B, 53C and 53D of co-pending U.S. patent application Ser. No. 14/336,958 and U.S. Pat. Nos. 8,824,442 and 8,467,363 and incorporated herein by reference for sub-arrays of patch antenna elements using pin feeds. Similarly, sub-arrays of patch antenna elements or stacked patch antenna elements using aperture feeds for such antenna arrays are shown in FIGS. 5A, 5B, 5C, 6, 7, 8A, 8B, 8C, 8D, 8E, 8F and 9 of co-pending U.S. patent application Ser. No. 14/197,158 and incorporated herein by reference.

IBRs also preferably scan during startup and normal operation the available spatially diverse receive antennas at the current frequency channel center frequency and bandwidth. In preferred embodiments, the number of spatially diverse receive antennas based upon physical separation, azimuthal orientation, or orthogonal polarization, or combinations thereof, exceeds the number of receive symbol streams and preferably also the number of receive RF chains. IBRs use the results of scanning such spatially diverse receive antennas to determine the amount of interference and/or the instant signal to noise plus interference for each such receive antenna.

IBRs advantageously selectively couple certain of such spatially diverse receive antennas or optimally combined subsets thereof to the available receive RF chains to mitigate the effects of uncoordinated interference on the instant, average or worst case performance of the receiver. In preferred embodiments, the number of available spatially diverse receive antennas or optimally combined subsets thereof exceeds the number of receive RF chains and thus the IBRs selectively couple the best performing subset using, for example only, a switch matrix or a phase/amplitude combiner network driven on a time adaptive basis, typically from a radio resource controller (RRC), to change the effect of the selective couplings over time as the optimal spatial combination changes. This is an example of optimization of the IBR performance in view of uncoordinated interference in the combined time and spatial domains.

IBRs also preferably scan during startup and normal operation the available spatially diverse receive antennas at other frequency channel centers and bandwidths available within the allocated receiver band of operation. This enables preferred embodiments of the IBR to simultaneously select optimal channel center frequency and bandwidth and selectively couple the best performing subset of receive antennas as a function of both frequency and space on a time adaptive basis, typically from the RRC, to change both instant frequency center and bandwidth and the antenna selective couplings over time as the optimal spatial and frequency parameter combinations change. This is an example of optimization of the IBR performance in view of uncoordinated interference in the combined frequency, time and spatial domains.

In some exemplary embodiments, IBRs advantageously also employ interference cancellation signal processing as part of the receive path in the IBR Channel MUX. In preferred embodiments, the number of receive RF chains exceeds the number of receive symbol streams and the additional diversity afforded by this excess of receiver resources can be utilized to advantageously cancel at least one significant interference source via certain signal processing techniques. In certain embodiments, the selective coupling of receive antennas to receive RF chains and/or the selection of frequency channel center and bandwidth, typically by the RRC, is predicated on desired IBR performance metrics after application of interference cancellation instead of before. Thus in some scenarios, such IBRs may opt for a combination of certain selectively coupled receive antennas plus frequency channel centers or bandwidths that are impaired by a relatively large interferer amenable to significant interference cancellation rather than opt for a different combination with relatively less interference power but wherein such interference originates from sources not amenable to significant interference cancellation. This is an example of optimization of the IBR performance in view of uncoordinated interference in the combined frequency, time, cancellation and spatial domains.

Additionally, certain IBR embodiments may also adapt the usage of combinations of selectively coupled receive antennas plus frequency channel centers or bandwidths that comprise a relatively large interferer amenable to significant interference cancellation rather than combinations with relatively small interferers not amenable to significant interference cancellation as a function of changing conditions over time. This is an example of optimization of the IBR performance in view of uncoordinated interference in the combined frequency, time, cancellation and spatial domains.

Some embodiments of IBRs use certain adjunct receive antennas, also known as "probe-in-space" or "sniffer" antennas, with significantly different channel response characteristics such as directivity, orientation and/or polarization than those usually expected to provide strong reception of the desired IBR RF transmission such that such adjunct antennas may experience interference signal power at a greater ratio to that of the desired IBR RF transmission. Under certain conditions, such IBRs may optimally select such adjunct antennas to be selectively coupled to at least one receive RF chain such that the IBR Channel MUX, or other IBR receiver element, can exploit a relatively strong reception at such adjunct antenna of an interferer otherwise only nominally detectable in a desired receive signal path, but yet significant enough to limit performance below that possible without such interference, such that an interference cancellation results within such receive RF chain signal processing path and tracks such interference accurately over time on a sample by sample basis. In practice, such an interference cancellation is never a "complete" cancellation. However, the performance gains from an at least partial cancellation as described herein can be substantial for certain arrangements of the interference source relative to the desired transmitter source.

In exemplary embodiments, such adjunct antennas may be physically located as separated from the desired signal transmit and/or receive antenna array elements. For example, an adjunct antenna may be physically located at the bottom or top of a horizontally or vertically arranged antenna array or alternatively may be located in between transmit antenna elements and receive antenna elements in a vertically arranged antenna array. In exemplary embodiments, such adjunct antennas may be nominally omnidirectional at least in the azimuthal orientation. In other exemplary embodiments, such adjunct antennas may be nominally of opposite directionality to the collective azimuthal coverage pattern in the azimuthal orientation and/or of broader elevation coverage pattern to increase the relative difference in desired signal to undesired interference ratio between the adjunct antenna(s) and the desired receive antenna array elements at least for interference sources that are not co-directional with the desired receive signal orientation. In some exemplary embodiments, multiple such adjunct antennas may each be co-polarized with a subset of the desired receive antenna array elements or may be cross-polarized with respect to two polarizations within the desired receive antenna array elements.

For example, if a receive antenna signal processing path had an interference level from a particular source that was 10 dB lower than the desired signal level but such interference level was also 10 dB higher than the effective noise floor, then performance would be significantly limited by such particular source interferer. If an adjunct antenna had different characteristics of directivity, orientation and/or polarization relative to the desired signal source versus the particular interference source by, for example, 20 dB, then in the adjunct path the interference level may be 10 dB higher than the desired signal. This asymmetry in signal to interference ratio between such paths enables a simple transfer function between such paths, in either the frequency or time domains, to be determined. For example, by subtracting a cancellation signal, that is phase and amplitude adjusted from the signal in the adjunct path specific to a particular desired signal path, from the received signal in such particular desired signal path, a substantial interference cancellation of approximately 10 dB would be achieved at the example levels described above. A particular advantage of performing interference cancellation in this manner is that such cancellation can be adaptively trained over time such that the cancellation operation works even with rapidly time-varying intensity levels for the interference source to the extent that the relative transfer function between the adjunct and desired paths is largely time invariant as would be expected with fixed devices. For example, if a backhaul radio using the directive gain antenna array elements as described were co-located, for example on the same access pole or roof mounting point, with a WiFi access point that becomes a dominant source of interference, this relative transfer function between the adjunct and desired paths would typically be largely time invariant. Use of adjunct antenna element(s) for such interference cancellation with the other interference mitigation techniques described herein is thus another example of optimization of the IBR performance in view of uncoordinated interference in the combined frequency, time, cancellation and spatial domains.

In certain IBR embodiments, one or more of such adjunct antenna(s) may also be used simultaneously to detect radars in conformance with Dynamic Frequency Selection (DFS) government regulations requiring avoidance of interference by the IBR with the operation of such radars, such as disclosed for FDD or ZDD backhaul radios in co-pending U.S. patent application Ser. No. 14/151,190. Additionally, in other IBR embodiments, such adjunct antennas may be used to detect and demodulate known interferers such as 802.11a, 802.11n, or 802.11 ac (or "WiFi") and then apply additional signal cancellation of such interferers from the desired signals in the spatially diverse receive signal processing paths.

To adapt the channel center frequency and/or channel bandwidth over time as local interference conditions change at a receiving IBR requires that such receiving IBR send an indication of such change to the transmitting IBR so that such transmitting IBR can adjust its transmitting channel center frequency and/or channel bandwidth to a desirable alternate setting. Similarly, in some IBR embodiments, certain adaptation of the instantaneous selective antenna couplings from transmit RF chains to directive gain transmit antenna elements may preferably have improved link performance relative to interference from other IBRs or uncoordinated sources if upon testing such a candidate change at the receiving IBR, such receiving IBR also sends an indication of such change to the transmitting IBR so that such transmitting IBR can adjust its transmit antenna pattern or IBR Channel MUX transmit path equalization parameters.

Uncoordinated interference in frequency bands of interest to IBR operation is observed as appearing and leaving on short time scales of order 100 µs, for example. To minimize the impact of interference when it appears at the receiving IBR, it is advantageous to send the indication that a change of operating parameters is needed to the transmitting IBR and then make the appropriate adjustments coordinated in time at both the receiving and the transmitting IBR all in the shortest possible elapsed time since such interference is first detected at the IBR receiver. Similarly, to maximize performance of the IBR link when interference is no longer detected and an immediate return to more optimal operating parameters is desired, it is also advantageous to send the indication of a change of operating parameters to the transmitting IBR and then make the appropriate adjustments coordinated in time at both the receiving and the transmitting IBR all in the shortest possible elapsed time since the absence of interference is detected at the IBR receiver.

FDD and ZDD backhaul radio systems have inherent advantages over TDD systems in terms of minimizing such interference driven signaling latency because such FDD or ZDD systems are normally transmitting and receiving at the same time. Thus for FDD or ZDD, interference indication signaling techniques such as control frames or appended control bits to each transmit block do not have to wait until the transmit portion of a superframe arrives as in TDD in order to be signaled to the other IBR in the instant link.

As described with respect to indicators for time domain re-transmission protocols at the block level, preferably such control indicators associated with interference detection signaling are also communicated so as to avoid the multiple block processing delays for encoding, interleaving, scrambling, encrypting, etc. in the transmit path and their inverse operations in the receive path. Exemplary techniques that avoid such block processing delays include appending bits or symbol samples to otherwise completed blocks, adding specific tones in the frequency domain that carry such signaling modulation, or combining sub-signals such as orthogonal direct sequence spread spectrum (DSSS) with the normal transmit block symbols.

However, another consideration for signaling such indicators of operating parameter changes for changing interference conditions is the robustness of such signaling because the consequences of having the receiving IBR in an instant link changing its operating parameters when the transmitting IBR does not due to failure to receive the parameter change message could be significant to the performance of the link depending on the time to correct the fault and recover.

One technique that certain IBR embodiments may use to enhance the robustness of such interference driven indication signaling is to use a modulation/coding scheme specifically for the indication signaling information that is more robust than that of the instant link in the feedback path and/or has more coding than that of the instant link in the feedback path. However, such coding may incur additional latency in the decoder and thus low latency decoding techniques such as Reed Muller codes may be preferable. However, to achieve robustness in these ways may require considerable overhead that detracts from the payload performance throughput in the feedback path and creates another consideration for the design of such a signaling system.

Figure 19:
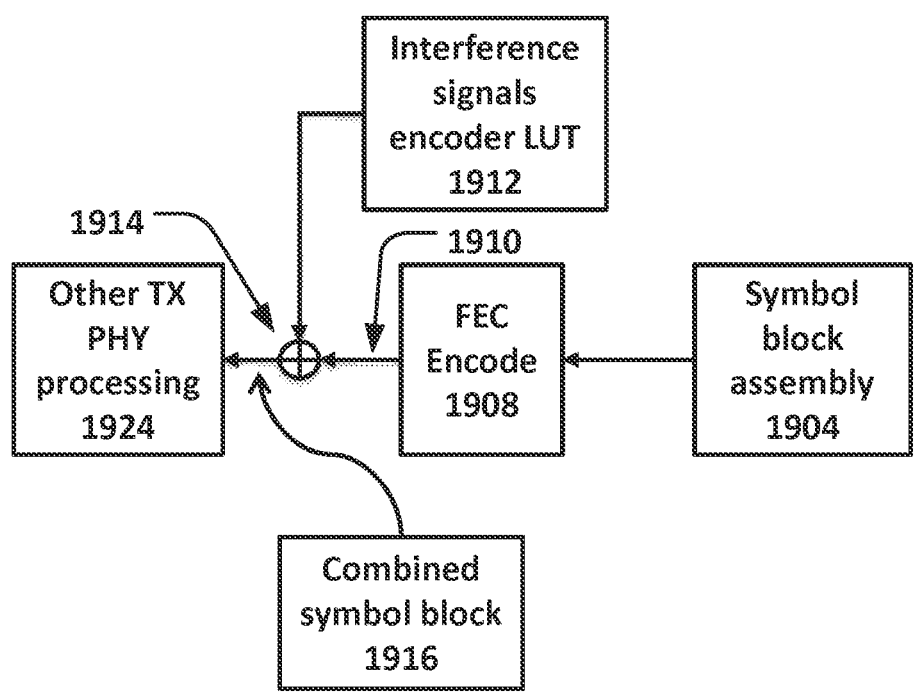
FIG. 19 is a block diagram of a transmit block processing section of an IBR according to one embodiment of the invention.

To mitigate the effects of such overheads, it is desirable to minimize the number of bits needed to communicate such interference driven changes. For example, IBRs could accumulate mutually shared lists of alternative operating parameters sets of, for example, channel center frequency, channel bandwidth and/or transmit antenna pattern combinations so that the signaling need only point to the index of one of these sets. For example, if four current sets are maintained, this may be signaled with only 2 bits. These sets may be established and updated over time via normal IBR control or management frames communicated between peer RRC or MAC entities. Alternatively, the signaling could be as little as 1 bit if setting such bit indicated only an advance of the index to the next set of parameters in the shared lists. In this approach, it may also be advantageous to continually update such lists so that the single bit moves the parameters to the best next choice at any time. This single bit approach might also be applied only to signaling upon detecting interference but not to signaling upon detecting the absence of interference because returning to maximum link performance is less time critical in most applications than avoiding link degradation due to the presence of interference. In one exemplary embodiment of interference detection signaling with reserved control bits in each normal transmit block, these reserved control bits are set appropriately before forward error correction encoding for the symbol block. In some other embodiments, such as illustrated in FIG. 19, the forward error correction output corresponding to desired values of the reserved control bits are combined from a "look up table" (or "LUT") with the rest of the encoded symbol block as part of the processing to form each normal transmit block. Such embodiments need additional implementation complexity but advantageously reduce the latency between determining interference detection at a receiver of an instant IBR link and communicating such interference detection to one or more transmitters of an instant IBR link such that resource allocation changes can be made.

An alternate approach that IBRs may use to signal interference driven indications for operating parameter changes with zero overhead in normal conditions where changes are not needed is to signal the interference driven change with interference signaling blocks substituted for the normal transmit block at the soonest available transmit block opportunity. For example, when a receiving IBR detects interference that triggers a need to change operating parameters at both receiving and transmitting IBRs for that instant link, then at the next available transmit block opportunity in the feedback path link, such a receiving IBR may transmit a predetermined block of transmit samples that comprise the indicated change that would be detected in the receiver of the transmitting IBR for the interference-affected link.

An exemplary interference signaling block is a sequence of time domain samples that are multiplexed into the transmit RF chains when interference signaling is triggered at the receiving IBR that detects the presence or absence of interference on its instant link. Such an interference signaling block is composed of a signature that when passed through a matched filter in either the time domain or frequency domain in the receive path can be used to detect the signaled bit(s) that indicate the operating parameter changes or the list index. Preferably such interference signaling signatures are chosen to minimally correlate to the matched filtering of normal payload transmit blocks to avoid false triggering of operating parameter changes at the transmitting IBR.

Note that the interference signaling block technique has very low overhead when interference indications are rare but its overhead of an entire transmit block may be larger than other techniques described herein when interference signaling is frequent. Thus, in some IBR embodiments, the signaling methodology is also adaptive to use the technique that minimizes overhead depending on the time varying nature of the observed interference patterns.

Note also that any interference signaling technique is always prone to some errors such as missed change indicators when a change was signaled or false indicators of change when no change was intended. Thus, IBRs preferably also include a recovery capability to minimize the time in which the transmitter and receiver operate with incompatible or sub-optimal operating parameters due to such errors. For example, IBRs may always maintain a mutually agreed upon recovery set of parameters to be used when a predetermined number of incorrectly received blocks are encountered.

In some operating situations, IBRs preferably change operating parameters even when the combination of frequency, time, spatial, and/or cancellation domain adaptation leads to acceptable link performance so that the instant IBR link reduces interference caused to other spectrum users in the vicinity. In one example, the other users are IBRs that may be detected via the IBMS and/or other methodology such as a self-organizing in-band signal as described in co-pending U.S. patent application Ser. No. 14/098,456. In another example, a WiFi AP with a BSSID or SSID on a protected list is detected and the IBR link adjusts operating parameters to minimize interference to such protected WiFi networks.

As described above for a backhaul radio to perform with high throughput and low latency in high interference wireless environments, both channel conditions and interference in the environment needs to be assessed periodically. This assessment needs to be performed accurately and continuously for optimum selection of resources across the combined frequency, time, cancellation and spatial domains but also with minimal usage of the radio resources essential to providing high throughput and low latency link performance at all times.

In one embodiment, channel and interference assessment on the IBR is carried out across all frequencies and receive antennas available for operation. Such receive antennas may include directive gain antenna elements such as the receive antenna sub-arrays described in co-pending U.S. patent application Ser. No. 14/336,958 and U.S. Pat. Nos. 8,824,442 and 8,467,363 or in co-pending U.S. patent application Ser. No. 14/197,158, or may include one or more adjunct antennas as described herein. In order to measure the interference for a given combination of channel center frequency, channel bandwidth and set of selective coupling settings, the received signal is analyzed in the frequency domain for some embodiments. For example, interference energy may be accumulated in frequency bins of a fixed size. The corresponding value is then stored for each receive antenna or for each set of selective coupling settings as appropriate at the particular channel frequency/bandwidth. Interference varies over time across space and frequency, so a large sample size is taken and statistical measures are used to improve reliability and utility of the estimate. Channel estimates that may provide a measure of a channel propagation characteristics assessment for a given combination of channel center frequency, channel bandwidth and set of selective coupling settings are taken using known preamble sequences at the transmitter and receiver to extract channel information using techniques known in the art. In exemplary embodiments, the frequency selective receive path channel multiplexer is used to measure the interference present in one or more of the receive chain output signals that are input to the frequency selective receive path channel multiplexer. In such embodiments, the frequency selective receive path channel multiplexer may measure such interference energy in frequency bins using a Discrete Fourier Transform or a Fast Fourier Transform. Also, the frequency selective receive path channel multiplexer may be used to provide the channel estimates for a given combination of channel center frequency, channel bandwidth and set of selective coupling settings.

Interference measurement can be done before and after the link is established. To perform this operation before the link is established, it is sufficient to use the transceivers to sweep all receive antenna and channel frequency/bandwidth combinations without self-interference.

However, once the link has been established, steps must be taken to ensure that the transmitted signal from the peer backhaul radio at the other side of the link is not measured as interference. In order to perform this measurement, IBR embodiments use a communication protocol to create a blanking interval wherein the one or more transmitters in communication with the instant IBR blanks (zeros) its signal for some pre-arranged periods of time, and the receiver of the instant IBR then performs measurements during the blanked out portions to measure the interference and noise level in the environment at its various receive antenna selective coupling and channel frequency/bandwidth combinations.

Figure 5:
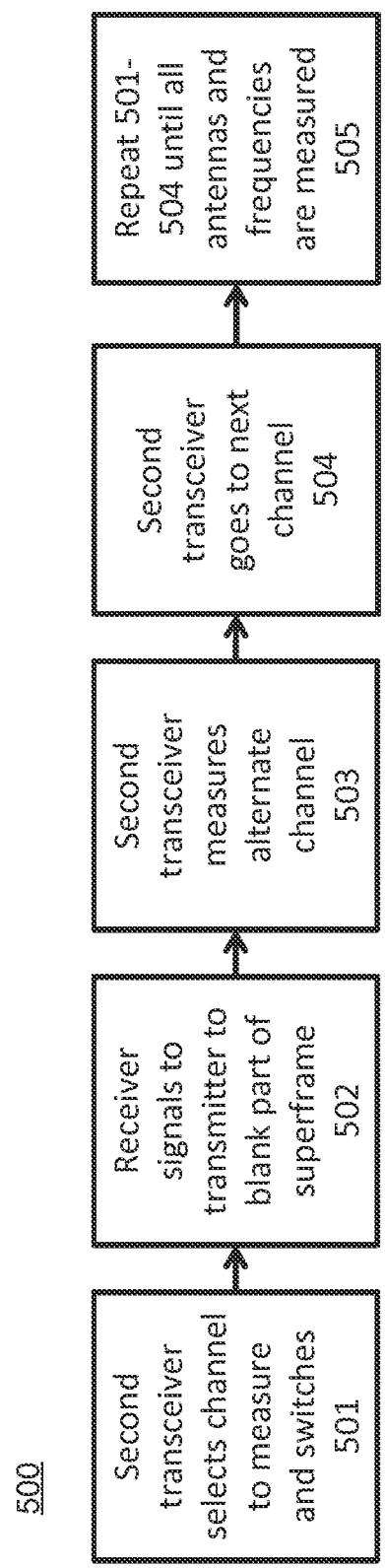
FIG. 5 shows a procedure for interference measurement of an established link according to one embodiment of the invention.

FIG. 5 shows a procedure 500 for interference measurement of an established link according to one embodiment of the invention.

The procedure 500 begins with the receiver using an alternate subset of the available receive RF chains and selectively coupling resources to measure interference in a candidate channel defined by a channel frequency/bandwidth and receive antenna combination that is different from that of a current channel used by the instant link (block 501).

The receiver signals to the transmitter to send blank signals, or blank transmit blocks, in a mutually agreed part of one or more superframes such that the receiver can measure uncoordinated interference sources in the candidate channel independent of self-interference from the intended transmitter (block 502).

During the mutually agreed part of the one or more superframes where the transmitter sends blank signals, the receiver obtains a measurement of the received signal energy and stores the result (block 503).

Once the measurement is complete, the alternate subset of the available receive RF chains and selectively coupling resources is set to a different candidate channel defined by a channel frequency/bandwidth and receive antenna combination (block 504).

The steps in blocks 501-504 may then be repeated for a multiplicity of channel frequency/bandwidth and receive antenna combinations (block 505).

In order to blank out portions of the superframes at the transmitter, the receiver maintains the link while doing measurements so performance of the link is not impacted significantly. Thus, as described above, in some embodiments, an alternate subset of the available receive RF chains and selectively coupling resources is utilized for these measurements. These measurements are performed periodically to ensure up-to-date information on the interference conditions within the local wireless environment.

Alternatively, in some embodiments, interference assessment estimation can also be performed at one or more adjunct antennas without the need for transmit blanking by exploiting the directivity difference between the directive gain receive antenna elements and the one or more adjunct antennas and/or by accounting for a known channel response between the transmitter and the one or more adjunct antennas to determine the contribution attributable to uncoordinated interference at various frequency bins. This approach has the advantage that transmit blanking is not required in order to obtain an estimate of interference characteristics in the local environment at the current channel frequency/bandwidth.

Figure 6:
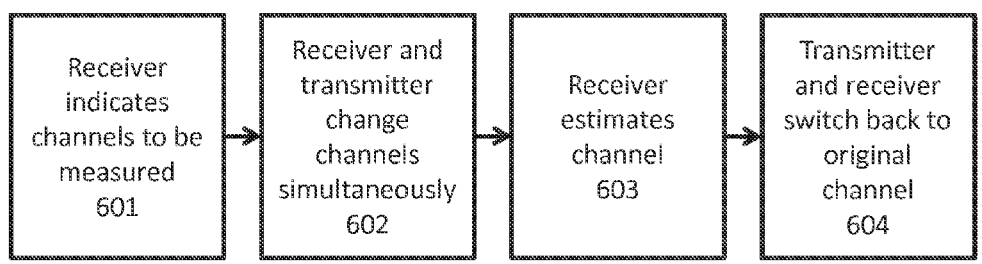
FIG. 6 shows a procedure to measure channel information across the band according to one embodiment of the invention.

In addition to interference assessment, a candidate channel is also measured to determine the optimal channel frequency/bandwidth and receive antenna combinations independent of interference. FIG. 6 shows a procedure 600 for measuring candidate channel information across the band according to one embodiment of the invention.

The procedure 600 begins with the receiver signaling to the transmitter that it wishes to make a candidate channel measurement at a given channel frequency/bandwidth, or a set of channel frequencies/bandwidths (block 601).

The receiver and transmitter start from an original operating channel frequency/bandwidth, and subsequently change operating channel frequency/bandwidth synchronously for a pre-determined length of time for each candidate channel frequency/bandwidth (block 602).

The receiver makes a multiplicity of measurements of channel propagation characteristics assessment based on each candidate channel frequency/bandwidth, including for different selective couplings to receive antennas if appropriate, that is synchronously changed for the pre-determined length of time (block 603).

After the multiplicity of measurements, the transmitter and receiver return to the original operating channel frequency/bandwidth (block 604).

To arrange the synchronous sending and receiving of blanked transmitter signals for the multiplicity of interference measurements and to synchronously change the operating channel frequency/bandwidth at the transmitter and the receiver for the multiplicity of measurements of channel propagation, a transaction defined by a state machine within a communications protocol may be advantageously used by some embodiments. For example, a transaction may be associated with an originator node and one or more responder nodes. A transaction may be a unidirectional transaction or a bidirectional transaction. A transaction may also comprise a multiplicity of control signal messages between the originator nodes and the one or more responder nodes. Each transaction may also have a transaction ID that identifies the transaction. The transaction ID may be carried on the multiplicity of control signal messages comprising the transaction. An exemplary embodiment of a control signal message provided within a transaction is described below.

Although the examples herein generally refer to a single responder, it should be understood that multiple responders are within the scope of this invention. For example, in a PMP or MP2P system operating as FDD or ZDD, the AE-IBR may have multiple RE-IBRs transmitting to it simultaneously in the same channel frequency/bandwidth. Thus, procedures to change to another channel frequency/bandwidth or to create a blanking interval for AE-IBR receiver measurements of interference at combinations of a channel frequency/bandwidth and set of selective coupling settings may require that two or more RE-IBR transmitters as responders participate in the transactions described herein. This can be achieved by either parallel responder messages to common originator messages or by separate transactions to multiple responders from a common originator.

In an exemplary deployment, a receiver determines that a better frequency is available for the link based on measuring the interference and current channel propagation characteristics assessment information. The receiver (originator) then originates a transaction to change to that channel frequency/bandwidth at a target superframe number. Typically, such a change may occur on the superframe boundary between two adjacent superframes. In some embodiments, one or more data transmit blocks at the end of the last superframe of the current channel frequency/bandwidth may be blanked or otherwise transmit inhibited so that both transmitter (responder) and receiver (originator) have a time period to effect the change to the new channel frequency/bandwidth by the start of the agreed upon superframe boundary. The transmitter (responder) acknowledges the request and responds to the message by sending an acknowledgement (ACK). The receiver (originator) then receives the ACK and sends confirmation of the ACK reception. The transmitter (responder) and receiver (originator) then change their transmit and receive channel frequency/bandwidth, respectively, to the agreed upon channel frequency/bandwidth at the target superframe number.

In an exemplary transaction state machine for unidirectional transactions, the originator node sends the control signals associated with the transaction to the one or more responder nodes at a regular signaling period. The regular signaling period may depend on the transaction ID.

A bidirectional transaction includes a multiplicity of steps, which ensure that the originator and responder node(s) corresponding to the transaction perform one or more operations at a specific value of a superframe number. FIG. 7 shows a procedure 700 for a bi-directional transaction from an originator node to one or more responder nodes.

The procedure 700 begins with the originator node beginning the transaction to start at a superframe number N on the link from the originator node to one or more responder nodes (block 701). In particular, the originator node sets a state of the transaction state machine to "INITIATED" at a superframe number before the superframe number N. The originator node also sends a control signal associated with the transaction and repeats it in one or more superframes with a superframe number less than superframe number N.

If a responder node of the one or more responder nodes associated with the transaction receives the message sent by the originator in the "INITIATED" state, the responder sends an ACK to the message sent by the originator if the superframe number is less than the superframe number N (block 702).

After the originator node receives the ACK from the responder node, the transaction state is changed to "CONFIRMED" (block 703). The originator node continues to control signal associated with the transaction but with the transaction state changed to "CONFIRMED" until superframe N.

The responder node receives the control signal from the originator node at state "CONFIRMED" and prepares to apply the transaction at superframe N (block 704).

If, at superframe N, the originator node has received the ACK from the responder node and the responder node has determined the status of the originator node to be "CONFIRMED", then both nodes apply the changes such as a different channel frequency/bandwidth or portion of the superframe for blank transmit signals or blocks associated with the transaction (block 705).

Figure 8:
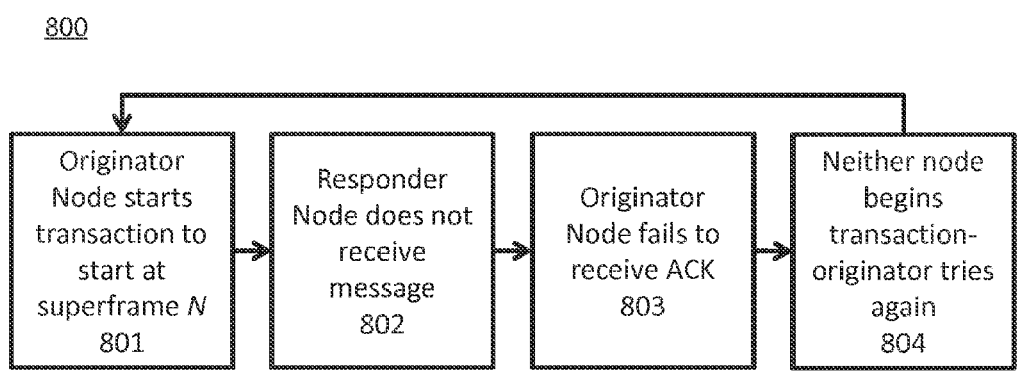
FIG. 8 shows a procedure for an error recovery according to one embodiment of the invention.

The description of FIG. 7 above is for a successfully applied transaction at both originator and responder. However, in practice the transaction may fail at various stages. FIG. 8 shows a procedure for an error recovery according to one embodiment of the invention wherein the originator node attempts to begin the transaction (block 801), but the responder node never receives the request for the transaction (block 802). In this case, the originator node never receives an ACK (block 803), so neither node proceeds with the transaction. In some embodiments, the originator node will attempt to initiate the transaction again (block 804) at a future time and thus realize an error recovery. For example, the procedure 700 shown in FIG. 7 may proceed for successful transactions and the procedure 800 shown in FIG. 8 may proceed for unsuccessful transactions.

Figure 9:
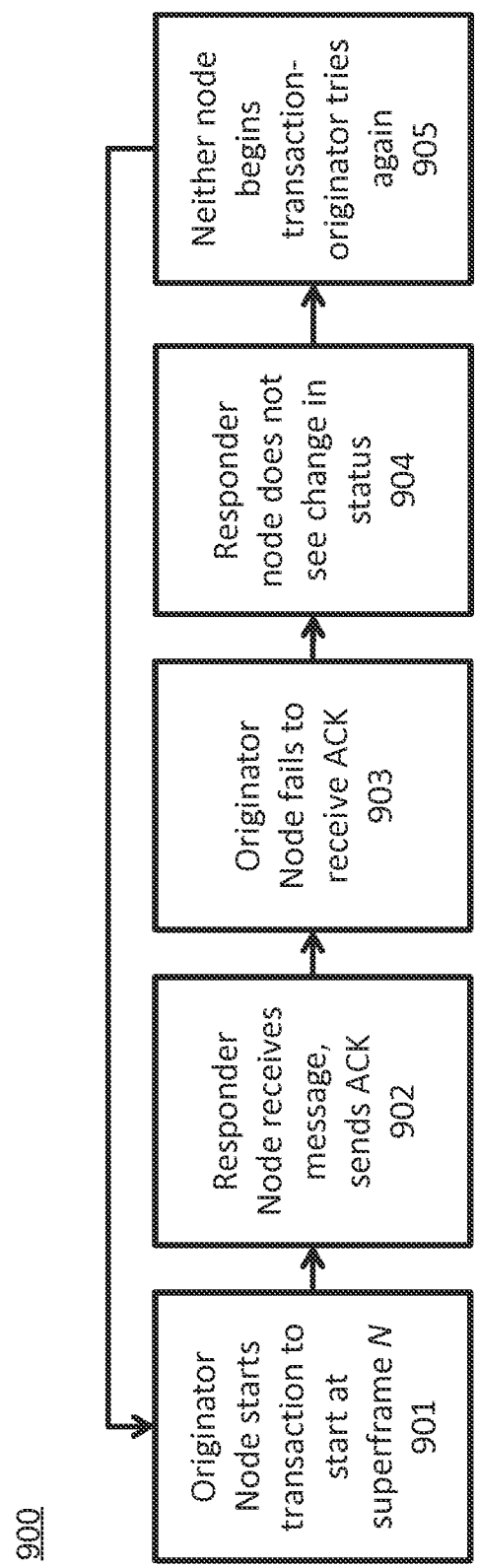
FIG. 9 shows an additional procedure for an error recovery according to one embodiment of the invention.

In other situations transactions fail after the responder node receives the initial request. For example, FIG. 9 shows an additional procedure 900 for an error recovery according to one embodiment of the invention. The procedure 900 similarly begins with the originator node starting a transaction a superframe N (block 901). The responder node receives the message and sends an ACK (block 902), but the originator node does not receive the ACK (block 903). The responder node therefore does not read the originator node's transaction state to be "CONFIRMED" and neither node proceeds with the transaction (block 904). In many embodiments, the originator node will attempt to initiate the transaction again (block 905) at a future time and thus realize an error recovery.

Figure 10:
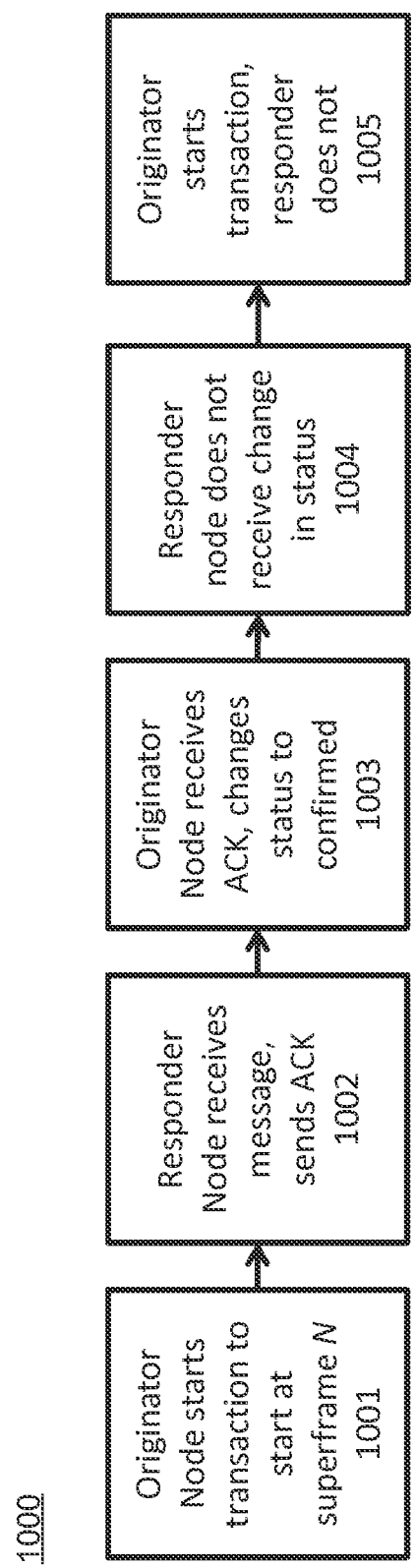
FIG. 10 shows a procedure for an error that causes transaction failure according to one embodiment of the invention.

In other situations transactions may be prone to failure after the originator node reaches the "CONFIRMED" state. For example, FIG. 10 shows a procedure 1000 for an error that causes transaction failure according to one embodiment of the invention. As shown in FIG. 10, the procedure 1000 similarly begins with the originator node starting a transaction at superframe N (block 1001). The responder node receives the message and sends an ACK (block 1002), and the originator node transitions to "CONFIRMED" state (block 1003). However, in this exemplary situation the responder never successfully receives the control signal indicating the "CONFIRMED" state for the transaction (block 1004). In this case, the originator node proceeds with the transaction while the responder node does not (block 905). This can lead to temporary performance degradation on the link until the originator node returns to the previous conditions in place before the planned transaction. However, with larger numbers of repetitions of the "CONFIRMED" control signal from the originator, the probability of this occurring may be made very small at the cost of increased transaction latency.

The number of repetitions for a given transaction may be situational as determined at the originator depending on instant conditions and the impact of a failed transaction. For example, a failed transaction to coordinate a series of blank transmit signal or blocks may have minimal performance impact on the link and may be statistically insignificant for interference assessment over loner periods of time, and thus such transactions may use fewer repetitions. In another example, a change from a usable first channel frequency/bandwidth to a second channel frequency/bandwidth predicted to provide even better link performance may use more repetitions in the transaction because the need for an immediate change is low and the relative cost of transaction failure is high. In yet another example, a change from a significantly impaired first channel frequency/bandwidth because of instant severe interference conditions to a second channel frequency/bandwidth predicted to provide better link performance may use fewer repetitions in the transaction because the need for an immediate change is extremely high.

In order to control the channel frequencies/bandwidths, receive antenna selective couplings, blanking durations, and blanking duty cycles over which the interference and the channel assessment are performed, a control entity referred to as the "arbiter" is used in exemplary embodiments. This arbiter may take many inputs into consideration when determining the above parameters, including time lapsed since the last measurement, current link demand, current measured throughput, estimated interference in the current channel, other current channel conditions, stability in the current channel, known channel conditions in other portions of the band, and known interference conditions in other portions of the band. This arbiter may then incorporate these inputs to control the interference assessment sensor and channel estimation sensor as to when and where to measure interference and channel conditions. For example, when the link is lightly loaded, the arbiter may issue control commands to these sensors to aggressively scan the channel to keep its information up-to-date, thereby making new measurements frequently. Conversely, when the link is heavily loaded, the arbiter may issue commands less frequently so that throughput will not be affected by taking measurements of alternate channels. Alternatively, the arbiter may monitor the throughput of the receiver and only perform interference or channel assessment if the throughput falls outside some limits, which may be configurable by a higher layer or by a user of the backhaul system.

In some embodiments, this arbiter is a subset of the radio resource controller described above. In other embodiments, this arbiter is a separate control entity that exists apart from other controllers within an IBR or any other backhaul radio, or this arbiter is a subset of another controller separate from that of a radio resource controller, if present in such backhaul radio. The arbiter control entity may be implemented as one or more software routines on a processor to execute the exemplary control signaling algorithms described above in reference to FIGS. 5-10 or alternatively may be implemented in software or hardware as a state machine embodying the same.

Once sufficient interference and channel information has been collected, a list of top channel frequencies/bandwidths and receive antenna selective coupling combinations (or sets of selective coupling settings) is generated or updated as appropriate. In many embodiments, the list is ordered from best to worst based upon performance metrics that reflect maximizing capacity and/or minimize outage in the instant link. The information in the list is then used to select the instant operating channel frequency/bandwidth and receive antenna selective coupling combination for data transmission. Alternate entries in the list may be used when the current selection no longer meets the target link performance metrics such as throughput, latency or frame loss rate.

In some situations, exemplary backhaul radios may determine such performance metrics directly from measurements of interference and channel propagation characteristics at candidate channel frequencies/bandwidths and receive antenna selective coupling combinations while in other situations, exemplary backhaul radios may only estimate such performance metrics indirectly from such measurements. Other performance metrics may include the signal to interference plus noise ratio (or "SINR") and the jitter that is a statistical measure of variance in the latency. In exemplary embodiments, the backhaul radio may determine the SINR per symbol stream directly by conventional techniques such as those used to generate the receive symbol streams at the frequency selective receive path channel multiplexer in normal operation. For some channel frequencies/bandwidths and receive antenna selective coupling combinations, it is sufficient to only estimate SINR by projecting the effect on SINR from different measures of interference during blanking intervals at different such combinations assuming that for a given channel bandwidth within the band of operation that the channel propagation characteristics are similar on average as those estimated or assessed previously and thus enable the list of top such combinations to be updated more frequently. Note further, that from an estimate of SINR, the expected MCS per symbol stream can be estimated and hence an estimated throughput for the link and nominal latency. By analyzing the characteristics of the observed interference, particularly the interference signal amplitude, during a blanking interval versus or over time (or versus or over transmit block measurement periods for an FFT block), the backhaul radio can similarly estimate the effect of measured interference on jitter and frame loss rate especially by comparing with the jitter and frame loss rate that may be determined directly for the present operating channel frequency/bandwidth and receive antenna selective coupling combination given its associated measure of interference.

As described above, exemplary embodiments may use several performance metrics that preferably are determined to be or estimated to be improved by changing a present operating channel frequency/bandwidth and receive antenna selective coupling combination to another operating channel frequency/bandwidth and receive antenna selective coupling combination within a list of such combinations. For example, performance metrics such as SINR or link throughput are improved if the numerical values of such metrics are made larger as a result of changing to a different operating channel frequency/bandwidth and receive antenna selective coupling combination. Conversely, performance metrics such as latency, jitter or frame loss rate are improved if the numerical values of such metrics are made smaller as a result of changing to a different operating channel frequency/bandwidth and receive antenna selective coupling combination.

In exemplary embodiments, users of backhaul radios such as IBRs may designate certain performance metrics or combinations thereof (possibly weighted to favor some metrics over others) as the metrics by which the improvement associated with a change in a operating channel frequency/bandwidth and receive antenna selective coupling combination is considered to exceed a threshold sufficient to make such a change. The users of such backhaul radios may set such performance metric improvement thresholds directly by terminal access to such radios, or may set such thresholds universally and distribute the results via an IBMS server to agent or agent to agent communications protocol or via a self-organizing backhaul radio protocol.

In some embodiments, the performance metric improvement thresholds may also be set by the user to apply based upon user traffic conditions in the instant link. For example, when the instant link throughput capacity to the receiver of the backhaul radio is fully utilized or near fully utilized by the user traffic demand at the one or more transmitters for the instant link, then the performance metric improvement threshold may be highly weighted toward maximizing the link throughput rate. Conversely, when the instant link throughput capacity to the receiver of the backhaul radio is only lightly utilized but the user traffic is dominated by latency and/or jitter sensitive applications such as, for example only, two-way telephony/voice calls, gaming inputs, mobile network hand-off control messages, or interactive video sessions, then the performance metric improvement threshold may be highly weighted toward minimizing the latency and/or jitter. Similarly, when the instant link throughput capacity to the receiver of the backhaul radio includes highly valuable control or management traffic for critical systems such as mobile network base station to base station signaling, then the performance metric improvement threshold may be weighted more toward minimizing the frame loss rate.

In some situations, certain channel frequencies/bandwidths may become unavailable during operation, such as via user input or Dynamic Frequency Selection (DFS) restrictions. Thus, the list of top channel frequencies/bandwidths and receive antenna selective coupling combinations may need to updated after such restrictions are applied.

In other embodiments, the transmitter of an instant backhaul radio link may schedule, without a specific request from the receiver of such link, blank signals or blank transmit blocks for the receiver of such link to perform interference assessment without interference from such transmitter. Similarly in other embodiments, the transmitter of an instant backhaul radio link may schedule, without a specific request from the receiver of such link, temporary channel frequency/bandwidth changes with repeated preamble or other training symbol transmit blocks to enable the receiver of such link to measure channel propagation characteristics for such candidate channel frequencies/bandwidths. The transmitter may schedule such blanking intervals or candidate channel measurement opportunities at either regular intervals or at such times as such transmitter deems appropriate given certain consideration factors such as instantaneous user throughput demand at the transmitter, interference severity as currently known to the transmitter, or updates on interference severity at the receiver as fed back to the transmitter. The transmitter may communicate such blanking intervals or candidate channel measurement opportunities to one or more target receivers, for example, via a link control block in some or every superframe or via a broadcast or unicast control frame.

For either the receiver-initiated or the transmitter-initiated scheduling of blanking intervals or channel propagation characteristics measurement intervals as described above, in some scenarios where the backhaul radios use an adjunct antenna for DFS radar detection while transmitting in normal FDD or ZDD operation, such radios may preferably operate with such scheduling arranged to produce such intervals with an apparently pseudo-random or non-uniform cadence such that false DFS radar detections do not occur due to these intervals. This is advantageous at least because DFS radar detection implementations are often sensitive to uniform pulsing of signal energy within the operating band, such as 5 GHz UNII, as such uniform pulsing may appear to have the same characteristic signature as certain types of radars.

The effectiveness of certain of the extreme interference protection techniques in the presence of apparently significant interference impairments is illustrated by measurements obtained with IBRs in a real world deployment in San Jose, Calif. during November of 2013. In this example, the two IBRs were deployed as an FDD system in the 5.25-5.35 GHz and 5.725-5.85 GHz bands under then-current FCC regulations wherein the channel center frequencies were optimized in each sub-band independently. Each IBR used a horizontally arranged antenna array similar to that depicted in FIGS. 52A, 52B and 52C of co-pending U.S. patent application Ser. No. 14/336,958 and U.S. Pat. Nos. 8,824,442 and 8,467,363 with eight directive gain receive antennas, with four of one polarization and four with the opposite polarization, and two directive gain transmit antennas with mutually opposite polarizations. The eight directive gain receive antennas were selectively coupled by a switch matrix to four receive RF chains coupled to an IBR Channel Mux that produced two receive symbol streams. These IBRs used dynamically adaptable channel bandwidths that per FCC regulatory definitions occupied 32, 16 or 8 MHz depending on the present interference conditions as described herein. Because of the redundancy available from four receive chain outputs into an IBR channel Mux that produced two receive symbol streams, such IBRs also had a capability to cancel certain persistent interferers as described herein and in at least co-pending U.S. patent application Ser. No. 14/337,744 and U.S. Pat. Nos. 8,811,365, 8,311,023 and 8,238,318, the entireties of which are hereby incorporated by reference. These IBRs also utilized a form of transmit block level re-transmission of blocks received in error wherein such re-transmission occurred in typically less than 1 ms. In an interference-free environment, these IBRs provided about 275 Mb/s throughput in each direction (or about 550 Mb/s aggregate throughput per link) with an Ethernet frame ingress to egress one-way latency across the entire link of typically less than 500 µs.

Figure 11:
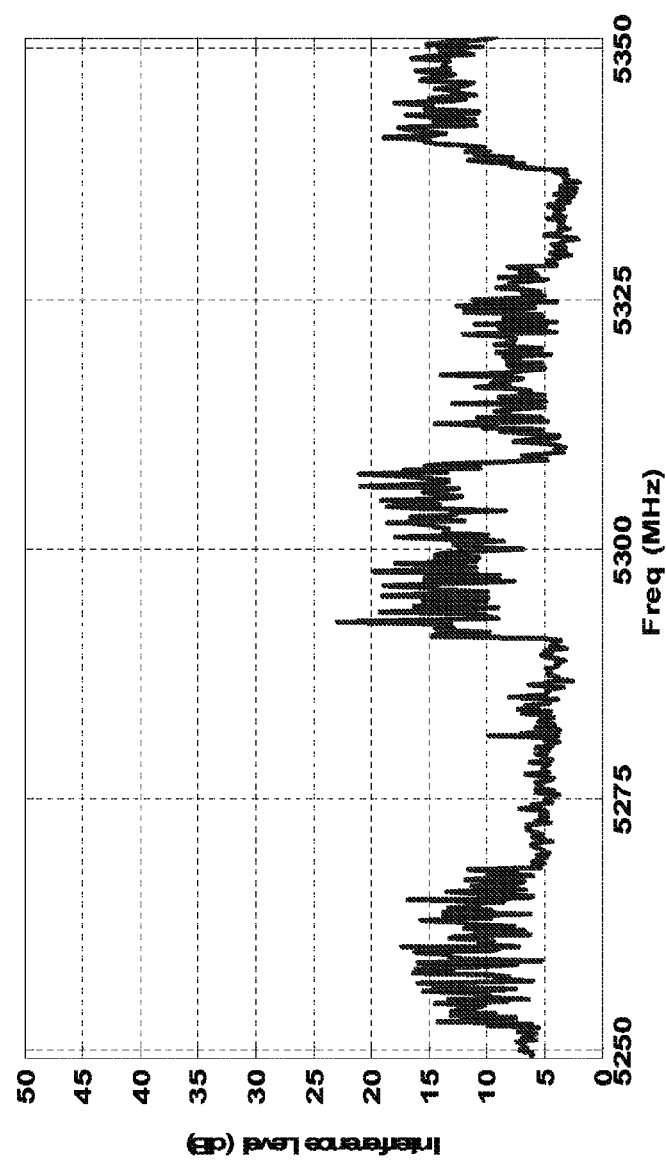
FIG. 11 shows a frequency domain sweep of the peak hold interference observed by an IBR in a 1 second period at a downtown San Jose, Calif. location in the 5.25-5.35 GHz band.
Figure 12:
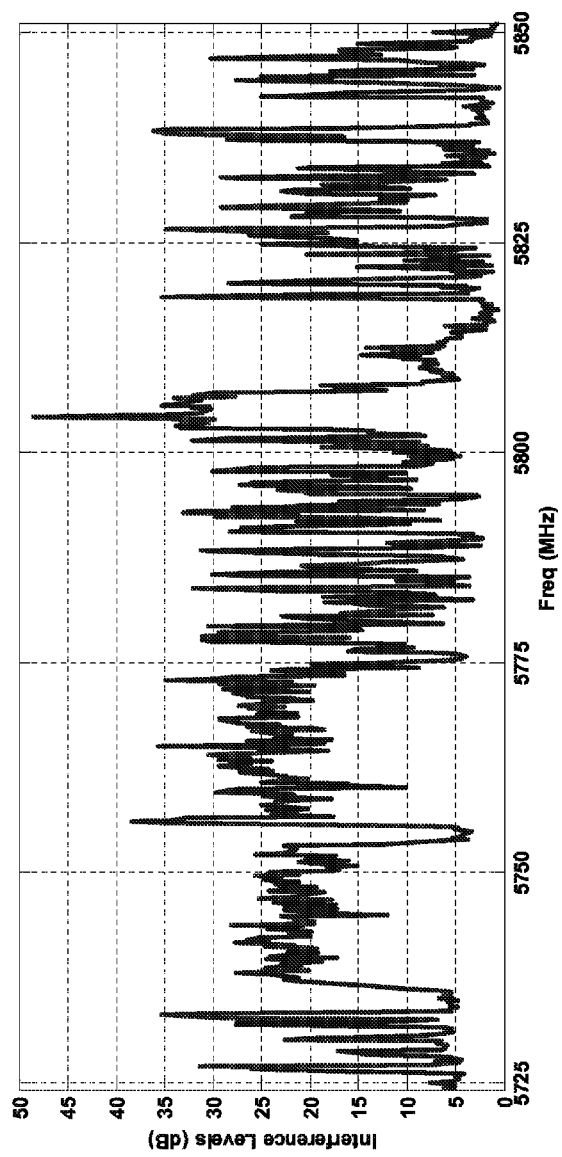
FIG. 12 shows a frequency domain sweep of the peak hold interference observed by an IBR in a 1 second period at a downtown San Jose, Calif. location in the 5.725-5.85 GHz band.
Figure 13:
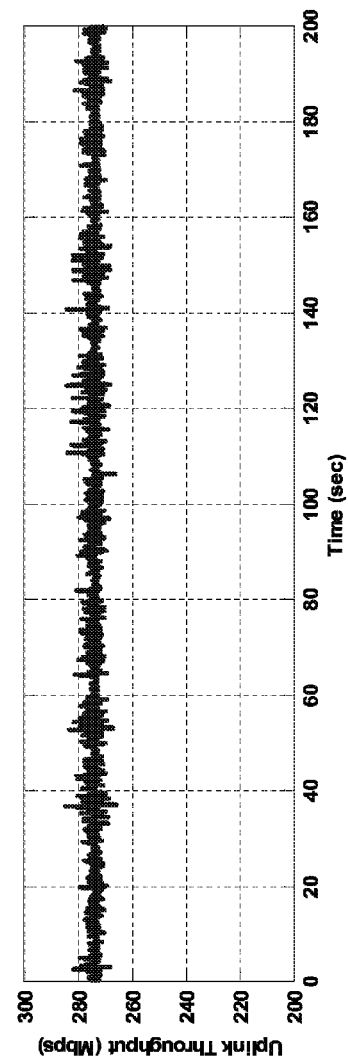
FIG. 13 shows the uplink throughput for an IBR link at a downtown San Jose, Calif. location in the 5.25-5.35 GHz band.
Figure 14:
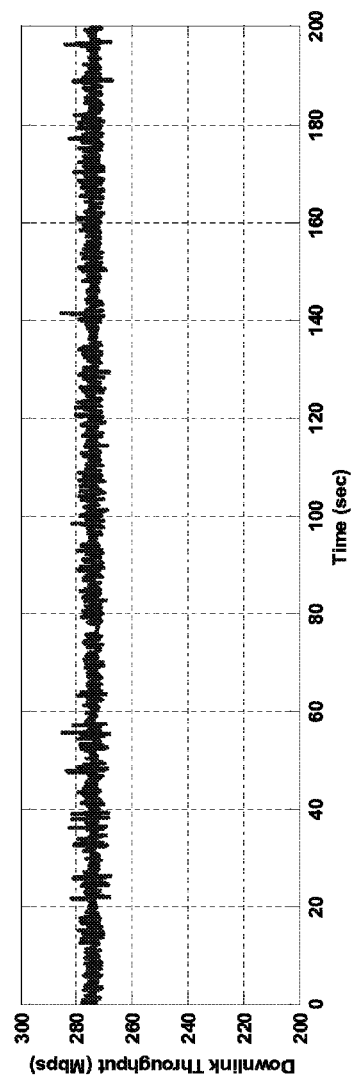
FIG. 14 shows the uplink throughput for an IBR link at a downtown San Jose, Calif. location in the 5.725-5.85 GHz band.

The typical maximum interference levels observed at the highest interference level amongst the eight directive gain receive antennas within the IBR receivers in a downtown San Jose, Calif. location in the 5.25-5.35 GHz and 5.725-5.85 GHz bands are shown in FIGS. 11 and 12 respectively for frequency domain sweeps across the respective bands and antennas with a 1 second long peak hold. FIG. 11 shows that significant interference in a typical 1 second period occurred in the 5.25-5.35 GHz band that exceeded 20 dB above the noise floor for at least one of the 8 directive gain receive antennas. FIG. 12 shows that significant interference in a typical 1 second period occurred in the 5.725-5.85 GHz band that exceeded 45 dB above the noise floor for at least one of the eight directive gain receive antennas. For conventional microwave backhaul radios that do not employ the simultaneous mitigation of interference impairments in multiple of the frequency, time, cancellation and spatial domains as described herein, the interference levels shown in FIGS. 11 and 12 would cause substantial performance degradation in throughput, latency and frame loss rate compared to interference-free operation at these same locations. However, the IBRs using exemplary combinations of the techniques described herein were able to maintain across long time periods of the severe interference levels, as shown typically in FIGS. 11 and 12, nearly their theoretical maximum throughputs of 275 Mb/s each direction, with negligible impact on latency and frame loss rate, as illustrated by FIGS. 13 and 14. FIGS. 13 and 14 respectively show throughput at this same downtown San Jose, Calif. location for the "uplink" direction at 5.25-5.35 GHz and the "downlink" direction at 5.725-5.85 GHz.

To understand how the IBRs can use exemplary combinations of the interference mitigation techniques described herein to deliver such high performance in view of such sever interference when viewed in the frequency domain, it is instructive to view the interference levels observable at such IBRs in various of the frequency/time, frequency/time/spatial, or frequency/time/spatial/cancellation domains as illustrated in FIGS. 15 to 18 herein. Since FIG. 12 shows even more significant interference for the "downlink" direction at 5.725-5.85 GHz than for the "uplink" direction at 5.25-5.35 GHz, FIGS. 15 to 18 and the analysis herein are directed only to the "downlink" direction at 5.725-5.85 GHz.

Figure 15A:
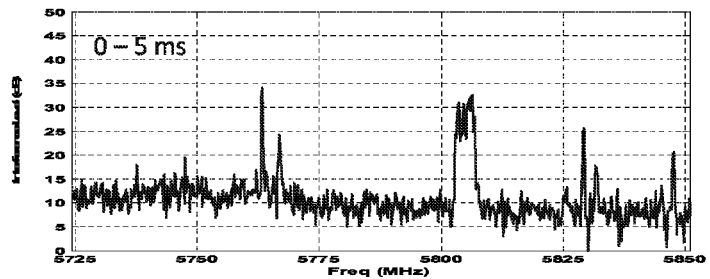
FIG. 15A shows a frequency domain sweep of the peak hold interference observed by an IBR in a first of three subsequent 5 ms periods at a downtown San Jose, Calif. location in the 5.725-5.85 GHz band.
Figure 15B:
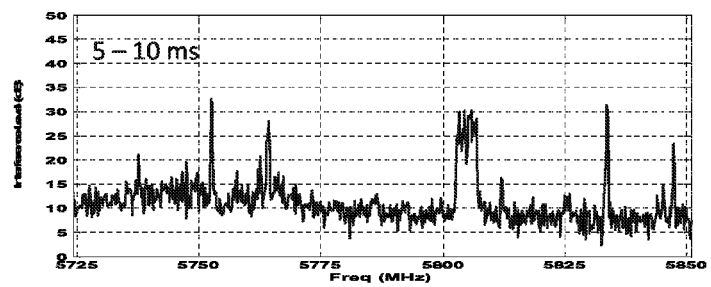
FIG. 15B shows a frequency domain sweep of the peak hold interference observed by an IBR in a second of three subsequent 5 ms periods at a downtown San Jose, Calif. location in the 5.725-5.85 GHz band.
Figure 15C:
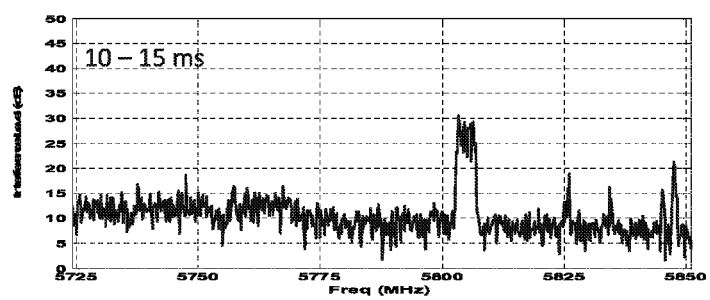
FIG. 15C shows a frequency domain sweep of the peak hold interference observed by an IBR in a third of three subsequent 5 ms periods at a downtown San Jose, Calif. location in the 5.725-5.85 GHz band.

FIGS. 15A to 15C show the interference situation depicted in FIG. 12 when broken down into three subsequent 5 ms peak hold frequency sweeps instead of 1 second peak hold frequency sweeps. FIGS. 15A to 15C illustrate that an IBR receiver in this location benefits greatly from the ability to change channel center frequency and/or bandwidth in the ms time domain (or within a small single digit number of typical superframes) because the worst interference observed in the frequency domain changes on these same timescales.

Figure 16A:
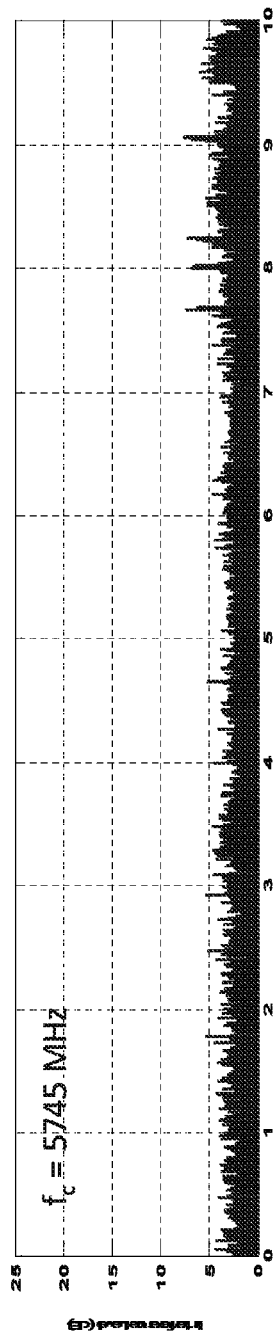
FIG. 16A shows a time domain sweep of the maximum instantaneous interference observed by an IBR at a first of three 20 MHz channels at a downtown San Jose, Calif. location in the 5.725-5.85 GHz band.
Figure 16B:
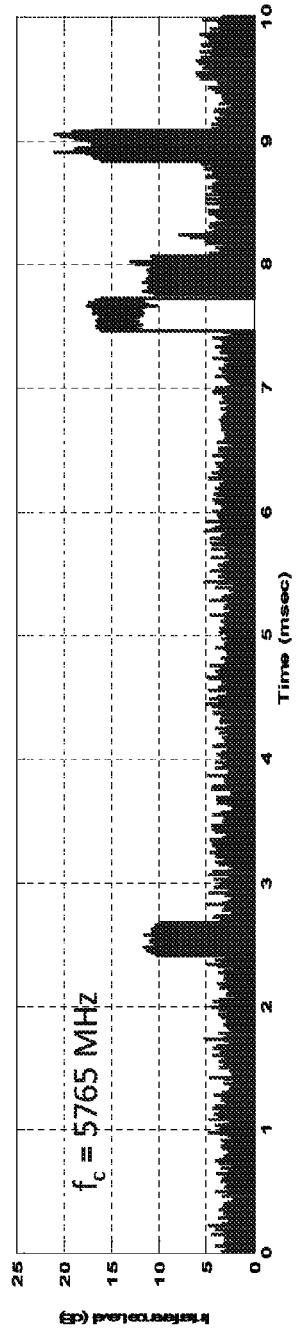
FIG. 16B shows a time domain sweep of the maximum instantaneous interference observed by an IBR at a second of three 20 MHz channels at a downtown San Jose, Calif. location in the 5.725-5.85 GHz band.
Figure 16C:
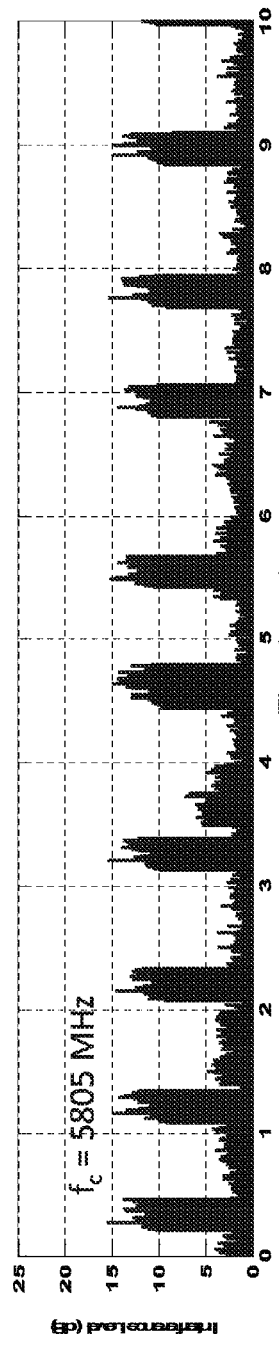
FIG. 16C shows a time domain sweep of the maximum instantaneous interference observed by an IBR at a third of three 20 MHz channels at a downtown San Jose, Calif. location in the 5.725-5.85 GHz band.
Figure 17A:
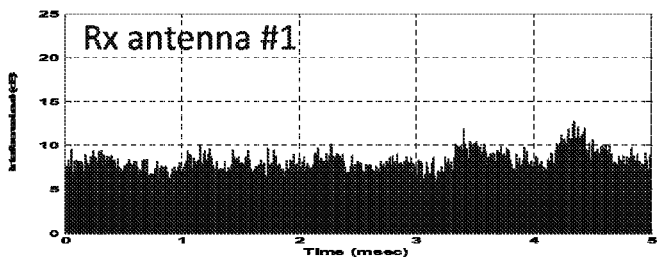
FIG. 17A shows a time domain sweep of the instantaneous interference observed at a first of eight receive antenna sub-arrays at a downtown San Jose, Calif. location in a 20 MHz channel at 5.805 GHz.
Figure 17B:
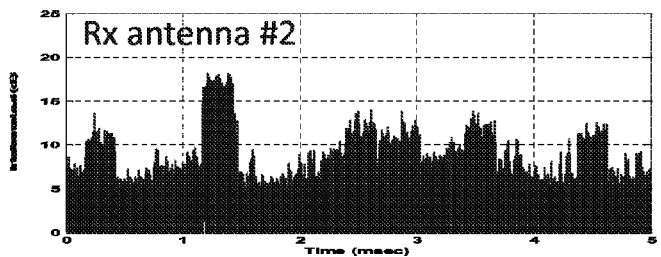
FIG. 17B shows a time domain sweep of the instantaneous interference observed at a second of eight receive antenna sub-arrays at a downtown San Jose, Calif. location in a 20 MHz channel at 5.805 GHz.
Figure 17C:
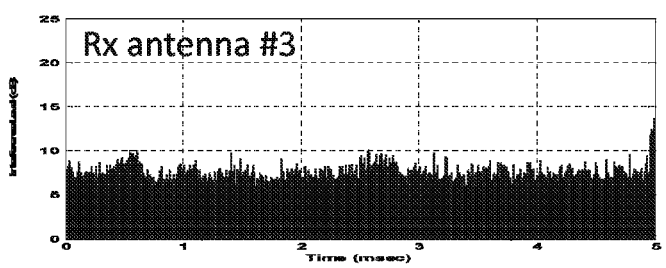
FIG. 17C shows a time domain sweep of the instantaneous interference observed at a third of eight receive antenna sub-arrays at a downtown San Jose, Calif. location in a 20 MHz channel at 5.805 GHz.
Figure 17D:
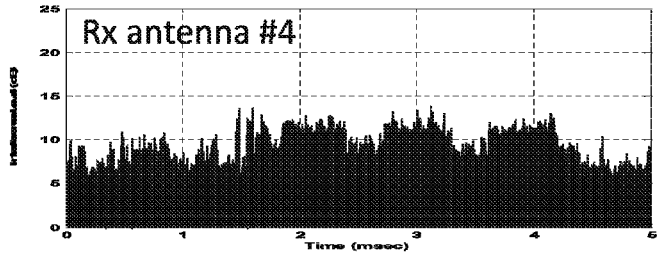
FIG. 17D shows a time domain sweep of the instantaneous interference observed at a fourth of eight receive antenna sub-arrays at a downtown San Jose, Calif. location in a 20 MHz channel at 5.805 GHz.
Figure 17E:
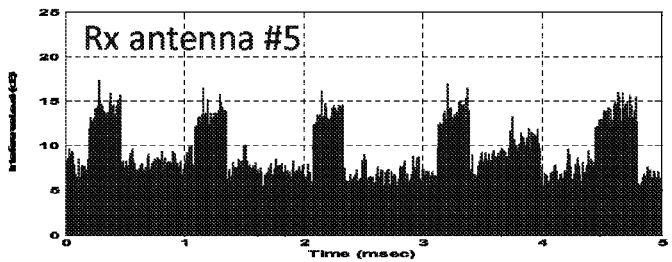
FIG. 17E shows a time domain sweep of the instantaneous interference observed at a fifth of eight receive antenna sub-arrays at a downtown San Jose, Calif. location in a 20 MHz channel at 5.805 GHz.
Figure 17F:
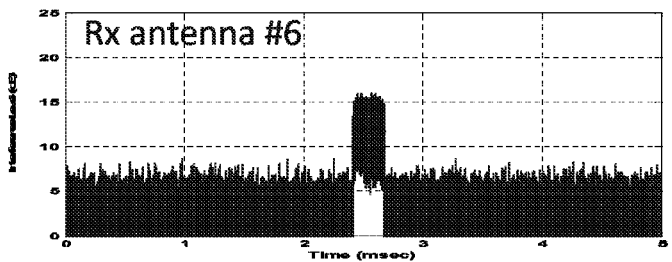
FIG. 17F shows a time domain sweep of the instantaneous interference observed at a sixth of eight receive antenna sub-arrays at a downtown San Jose, Calif. location in a 20 MHz channel at 5.805 GHz.
Figure 17G:
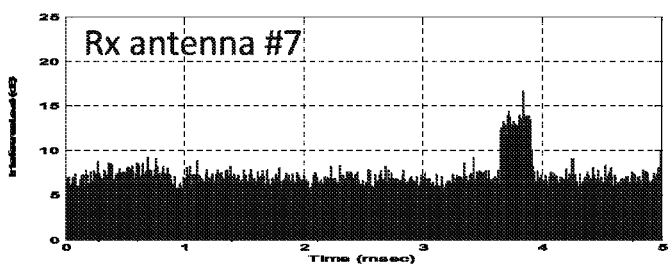
FIG. 17G shows a time domain sweep of the instantaneous interference observed at a seventh of eight receive antenna sub-arrays at a downtown San Jose, Calif. location in a 20 MHz channel at 5.805 GHz.
Figure 17H:
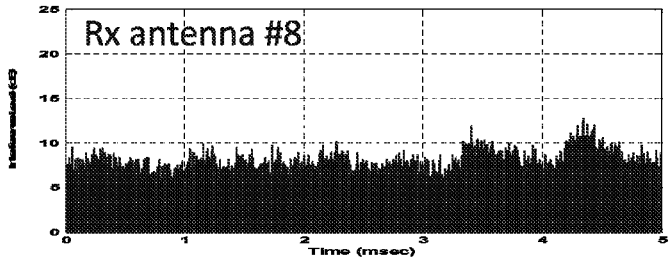
FIG. 17H shows a time domain sweep of the instantaneous interference observed at an eighth of eight receive antenna sub-arrays at a downtown San Jose, Calif. location in a 20 MHz channel at 5.805 GHz.

FIGS. 16A to 16C show an alternate view of the maximum interference observed within the IBR receive antenna array versus frequency and time compared to that shown in FIGS. 15A to 15C. In each of FIGS. 16A to 16C, the instantaneous maximum interference amongst any of the eight receive antenna sub-arrays is shown as a function of time over a 10 ms period at three different channel center frequencies each with a 20 MHz channel bandwidth. FIGS. 16A to 16C also illustrate than an IBR receiver in this location benefits greatly from the ability to change channel center frequency and/or bandwidth in the ms time domain (or within a small single digit number of typical superframes) because the worst interference observed in the frequency domain changes on these same timescales.

FIGS. 17A to 17H show the variation in instantaneous interference observed at the highest interference channel frequency of 5.805 GHz (see FIG. 16C) within the eight different spatial domain views provided by the eight receive antenna sub-arrays (Rx antenna #1-8) in this IBR embodiment. In each of FIGS. 17A to 17H, the instantaneous interference level at each of the eight receive antenna sub-arrays (Rx antenna #1-8) is shown as a function of time over a 5 ms period at the 5.805 GHz center frequencies with a 20 MHz channel bandwidth. FIGS. 17A to 17H illustrate than an IBR receiver in this location benefits greatly from the ability to selectively couple the four available receive RF chains to the eight available receive antenna sub-arrays with changes in the selective coupling in the ms time domain (or within a small single digit number of typical superframes) because the worst interference observed in the spatial domain changes on these same timescales.

Figure 18A:
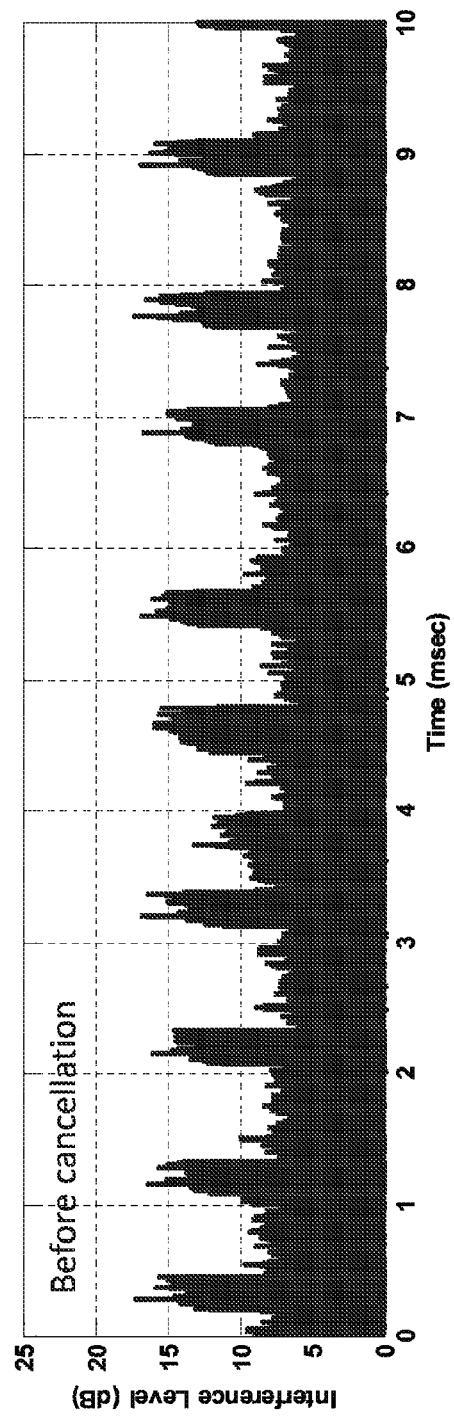
FIG. 18A shows a time domain sweep of the instantaneous interference observed at a fifth of eight receive antenna sub-arrays at a downtown San Jose, Calif. location in a 20 MHz channel at 5.805 GHz before application of a dominant interferer cancellation.
Figure 18B:
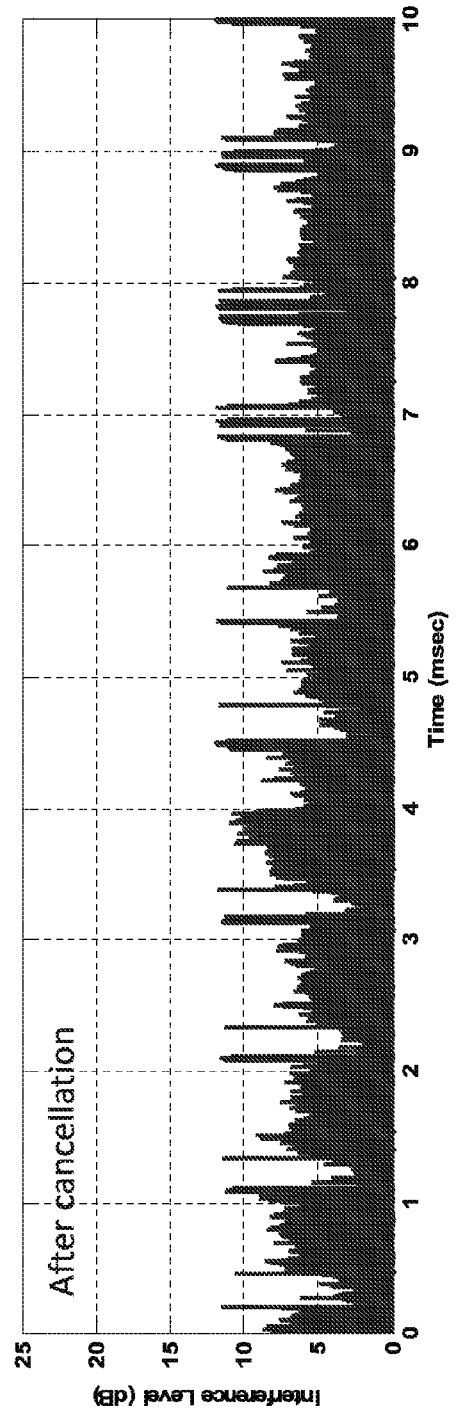
FIG. 18B shows a time domain sweep of the instantaneous interference observed at a fifth of eight receive antenna sub-arrays at a downtown San Jose, Calif. location in a 20 MHz channel at 5.805 GHz after application of a dominant interferer cancellation.

FIGS. 18A and 18B show that for the worst interference spatial choice of the fifth receive antenna sub-array at the worst interference channel frequency of 5.805 GHz, a significant reduction in interference as referred to the input of the IBR Channel Mux is possible using the techniques described herein and in the referenced co-pending applications. Note that in actual operation with the performance shown by FIG. 14, such interference cancellation was not utilized even in the severe interference environment shown by FIG. 12 because the combination of extreme interference protection techniques described herein across the frequency, time and spatial domains was adequate to achieve full performance in the exemplary IBR link at this severely interfered San Jose, Calif. location.

FIG. 19 illustrates a transmit block processing section of an IBR according to one embodiment of the invention. As shown in FIG. 19, the transmit block processing section 1900 includes a symbol block assembly 1904 connected to a forward error corrector 1908. The symbol block assembly 1904 provides symbol blocks to the forward error corrector 1908 for forward error correct. The transmit block processing section 1900 further includes an interference signals encoder look up table (LUT) 1912 connected to a combiner 1914. The forward error corrector 1908 is also connected to the combiner 1912. The forward error correction output 1910, corresponding to desired values of the reserved control bits, are combined at the combiner 1914 from LUT 1912 with the rest of the encoded symbol block as part of the processing to form each normal transmit block (combined symbol block 1916). The combined symbol block 1916 is then processed in the IBR for other Tx PHY processing 1924.

Numerous additional variations of the above-described elements of the IBR can also be advantageously utilized in substitution for or in combination with the exemplary embodiments described above. For example, channel assessment information may be transmitted from one IBR to the other, to exploit reciprocity. Alternatively, within the same IBR, knowledge of the receive antenna sub-array patterns may be used to infer channel propagation in some directions, thereby reducing the number of measurements needed. Also for example, the exemplary IBR embodiments with techniques described herein for interference assessment can also be used to assess self-interference in a ZDD transceiver as described in co-pending U.S. patent application Ser. No. 14/108,200 and U.S. Pat. Nos. 8,638,839 and 8,422,540 such that adaptable transversal filter coefficients can be accurately and efficiently determined during normal operation.

One or more of the methodologies or functions described herein may be embodied in a computer-readable medium on which is stored one or more sets of instructions (e.g., software). The software may reside, completely or at least partially, within memory and/or within a processor during execution thereof. The software may further be transmitted or received over a network.

The term "computer-readable medium" should be taken to include a single medium or multiple media that store the one or more sets of instructions. The term "computer-readable medium" shall also be taken to include any medium that is capable of storing, encoding or carrying a set of instructions for execution by a machine and that cause a machine to perform any one or more of the methodologies of the present invention. The term "computer-readable medium" shall accordingly be taken to include, but not be limited to, solid-state memories, and optical and magnetic media.

Embodiments of the invention have been described through functional modules at times, which are defined by executable instructions recorded on computer readable media which cause a computer, microprocessors or chipsets to perform method steps when executed. The modules have been segregated by function for the sake of clarity. However, it should be understood that the modules need not correspond to discrete blocks of code and the described functions can be carried out by the execution of various code portions stored on various media and executed at various times.

It should be understood that processes and techniques described herein are not inherently related to any particular apparatus and may be implemented by any suitable combination of components. Further, various types of general purpose devices may be used in accordance with the teachings described herein. It may also prove advantageous to construct specialized apparatus to perform the method steps described herein. The invention has been described in relation to particular examples, which are intended in all respects to be illustrative rather than restrictive. Those skilled in the art will appreciate that many different combinations of hardware, software, and firmware will be suitable for practicing the present invention. Various aspects and/or components of the described embodiments may be used singly or in any combination. It is intended that the specification and examples be considered as exemplary only, with a true scope and spirit of the invention being indicated by the claims.

What is claimed is:

1. A backhaul radio for exchanging one or more data interface streams with one or more other backhaul radios, said backhaul radio comprising:
   a plurality of receive radio frequency (RF) chains, wherein each receive RF chain is configured to convert from a respective one of a plurality of receive RF signals within a receive frequency band to a respective one of a plurality of receive chain output signals, and wherein each said respective one of a plurality of receive RF signals is characterized by at least a receive channel center frequency and a receive channel bandwidth amongst either of a multitude of possible receive channel center frequencies or a multitude of possible receive channel bandwidths, respectively;
   a plurality of transmit radio frequency (RF) chains, wherein each transmit RF chain is configured to convert from a respective one of a plurality of transmit chain input signals to a respective one of a plurality of transmit RF signals within a transmit frequency band, and wherein each said respective one of a plurality of transmit RF signals is characterized by at least a transmit channel center frequency and a transmit channel bandwidth amongst either of a multitude of possible transmit channel center frequencies or a multitude of possible transmit channel bandwidths, respectively;
   a plurality of directive gain antenna elements, wherein each directive gain antenna element is configured to operate over at least both of the transmit frequency band and the receive frequency band; and
   a plurality of duplexer filters, wherein each duplexer filter comprises at least a receive band-select filter configured to selectively pass RF signals within the receive frequency band and a transmit band-select filter configured to selectively pass RF signals within the transmit frequency band, wherein each duplexer filter is couplable or coupled to at least one of the plurality of directive gain antenna elements, wherein the receive band-select filter of each duplexer filter is couplable or coupled to at least one of the plurality of receive RF chains, and wherein the transmit band-select filter of each duplexer filter is couplable or coupled to at least one of the plurality of transmit RF chains;
   wherein the backhaul radio is configured to determine a measure of interference associated with each one of a plurality of combinations of at least receive channel center frequency and receive channel bandwidth;
   wherein the backhaul radio is further configured to determine the measure of interference associated with each respective one of the plurality of combinations of at least receive channel center frequency and receive channel bandwidth during a respective blanking interval in which the one or more other backhaul radios substantially inhibit transmissions within a respective frequency channel corresponding to the respective one of the plurality of combinations of at least receive channel center frequency and receive channel bandwidth;
   wherein the backhaul radio is configured to determine or estimate one or more performance metrics associated with each one of the plurality of combinations of at least receive channel center frequency and receive channel bandwidth, said determining or estimating of the one or more performance metrics being based at least upon the measure of interference; and
   wherein the backhaul radio is configured to change at least one or more of the plurality of receive RF signals from being characterized by a first combination of at least receive channel center frequency and receive channel bandwidth to being characterized by a second combination of at least receive channel center frequency and receive channel bandwidth, said changing being based at least upon an opportunity to improve at least one of the one or more performance metrics.

2. The backhaul radio of claim 1, further comprising:
   one or more selectable RF connections for selectively coupling certain of the plurality of directive gain antenna elements to certain of the plurality of receive RF chains according to a set of selective receive coupling settings;
   wherein at least one of the plurality of combinations further includes at least one of a plurality of possible sets of selective receive coupling settings.

3. The backhaul radio claim 2, further comprising: a radio resource controller, wherein the radio resource controller is configured to set or cause to be set specific selective receive couplings between the certain of the plurality of directive gain antenna elements and the certain of the plurality of receive RF chains according to the set of selective receive coupling settings.

4. The backhaul radio of claim 3, further comprising:
   a backhaul management system agent that is configured to set or cause to be set certain policies relevant to the radio resource controller, wherein the backhaul management system agent is configured to exchange information with other backhaul management system agents within other backhaul radios or with one or more backhaul management system servers.

5. The backhaul radio of claim 4 wherein the information that can be exchanged with said backhaul management system agent can be used at least to set or cause to be set at least one of a receive channel center frequency, a specific selective receive coupling between at least one of the certain of the plurality of directive gain antenna elements and at least one of the certain of the plurality of receive RF chains, or a receive channel bandwidth.

6. The backhaul radio of claim 1, further comprising:
   one or more demodulator cores, wherein each demodulator core is configured to demodulate one or more of a plurality of receive symbol streams to produce one or more receive data interface streams;
   a frequency selective receive path channel multiplexer, interposed between the one or more demodulator cores and at least two of the plurality of receive RF chains, wherein the frequency selective receive path channel multiplexer is configured to generate the plurality of receive symbol streams from at least two of the plurality of receive chain output signals, and wherein frequency selective receive path channel multiplexer is further configured to determine the measure of interference associated with each of the plurality of combinations of at least receive channel center frequency and receive channel bandwidth.

7. The backhaul radio of claim 1 wherein each one of the plurality of receive RF chains comprises at least a vector demodulator and two analog to digital converters that are configured to produce the respective one of the plurality of receive chain output signals, each said respective one of the plurality of receive chain output signals comprised of digital baseband quadrature signals.

8. The backhaul radio of claim 1 wherein at least one of the plurality of receive RF chains comprises at least one downconverter capable of producing an intermediate frequency (IF) signal.

9. The backhaul radio of claim 6 wherein the frequency selective receive path channel multiplexer comprises at least one of a Space Division Multiple Access (SDMA) combiner or equalizer, a maximal ratio combining (MRC) combiner or equalizer, a minimum mean squared error (MMSE) combiner or equalizer, an Eigen Beam Forming (EBF) combiner or equalizer, a receive beam forming (BF) combiner or equalizer, a Zero Forcing (ZF) combiner or equalizer, a channel estimator, a Maximal Likelihood (DL) detector, an Interference Canceller (IC), a VBLAST combiner or equalizer, a Discrete Fourier Transformer (DFT), a Fast Fourier Transformer (FFT), or an Inverse Fast Fourier Transformer (IFFT).

10. The backhaul radio of claim 2 wherein at least one of the one or more selectable RF connections comprises at least one RF switch, and wherein at least one mapping of ports in the RF switch can be changed according to the set of selective receive coupling settings.

11. The backhaul radio of claim 2 wherein at least one of the one or more selectable RF connections comprises at least one RF or IF combiner or splitter with at least one adjustable path, and wherein at least one of a phase or amplitude for said at least one adjustable path can be changed according to the set of selective receive coupling settings.

12. The backhaul radio of claim 2 wherein the certain of the plurality of directive gain antenna elements that can be selectively coupled to the certain of the plurality of receive RF chains includes at least a first subset with a first polarization and a second subset with a second polarization.

13. The backhaul radio of claim 2 wherein the certain of the plurality of directive gain antenna elements that can be selectively coupled to the certain of the plurality of receive RF chains are arranged on a plurality of facets with one or more directive gain antenna elements per facet, and wherein each facet is oriented at a different azimuthal angle relative to at least one other facet.

14. The backhaul radio of claim 2 wherein the number of directive gain antenna elements that can be selectively coupled to receive RF chains exceeds the number of receive RF chains that can accept receive RF signals from the one or more selectable RF connections.

15. The backhaul radio of claim 6 wherein the number of directive gain antenna elements that can be selectively coupled to receive RF chains exceeds the number of the plurality of receive symbol streams.

16. The backhaul radio of claim 1 wherein the measure of interference associated with each of the plurality of combinations of at least receive channel center frequency and receive channel bandwidth includes a determination of an energy in each of a plurality of frequency bins using a Discrete Fourier Transform or a Fast Fourier Transform.

17. The backhaul radio of claim 1 wherein the blanking interval corresponds to a time duration for a number of transmit blocks within a superframe.

18. The backhaul radio of claim 1, further comprising:
an arbiter control entity, wherein the arbiter control entity is capable of sending and receiving one or more control signals or frames to and from the one or more other backhaul radios in order to mutually arrange the blanking interval.

19. The backhaul radio of claim 1 wherein the one or more performance metrics associated with each one of the plurality of combinations of at least receive channel center frequency and receive channel bandwidth includes at least one of or a weighted combination of a plurality of a signal to interference plus noise ratio (SINR), a link throughput, a latency, a jitter or a frame loss rate.

20. The backhaul radio of claim 1 wherein the changing from the first combination to the second combination occurs at a superframe boundary mutually agreed upon by the backhaul radio and the one or more other backhaul radios.

21. The backhaul radio of claim 1 wherein the backhaul radio is configured to determine a channel propagation characteristics assessment for a wireless link between the backhaul radio and at least one of the one or more other backhaul radios, said channel propagation characteristics assessment associated with at least one of the plurality of combinations of at least receive channel center frequency and receive channel bandwidth.

22. The backhaul radio of claim 21 wherein the determining or estimating the one or more performance metrics associated with each one of the plurality of combinations of at least receive channel center frequency and receive channel bandwidth is also based at least upon the channel propagation characteristics assessment.

23. The backhaul radio of claim 22 wherein the one or more performance metrics associated with each one of the plurality of combinations of at least receive channel center frequency and receive channel bandwidth includes at least one of a signal to interference plus noise ratio (SINR) or a link throughput, or a weighted combination of a signal to interference plus noise ratio (SINR) and a link throughput, or a weighted combination at least one of a signal to interference plus noise ratio (SINR) or a link throughput plus at least one of a latency, a jitter or a frame loss rate.

24. The backhaul radio of claim 1, further comprising:
one or more adjunct antenna elements, wherein at least one of the one or more adjunct antenna elements has a larger azimuthal coverage pattern than any of the plurality of directive gain antenna elements.

25. The backhaul radio of claim 24 wherein the backhaul radio is configured to at least partially cancel an interfering signal received at at least one of the one or more adjunct antenna elements within at least one of a plurality of receive symbol streams, and wherein the determining or estimating the one or more performance metrics associated with each one of the plurality of combinations of at least receive channel center frequency and receive channel bandwidth is also based on an estimated improvement due to said at least partially cancelling.

26. The backhaul radio of claim 1 wherein at least one of the plurality of combinations of at least receive channel center frequency and receive channel bandwidth includes a channel center frequency within the 5 GHz UNII band.

27. The backhaul radio of claim 24 wherein the backhaul radio is configured to utilize at least one of the one or more adjunct antenna elements for Dynamic Frequency Selection (DFS).

28. The backhaul radio of claim 27 wherein the backhaul radio is configured to schedule successive ones of the respective blanking interval so as to appear non-uniform or pseudo-random to a DFS radar detector.

29. The backhaul radio of claim 1 wherein the backhaul radio is configured to substantially inhibit transmissions within a transmit frequency channel corresponding to the transmit channel center frequency and the transmit channel bandwidth during a transmit blanking interval in response to one or more control signals or frames from the one or more other backhaul radios.

30. The backhaul radio of claim 29 wherein the transmit blanking interval corresponds to a time duration for a number of transmit blocks within a superframe.

* * * * *